US007739712B2

(12) United States Patent
Boyden et al.

(10) Patent No.: US 7,739,712 B2
(45) Date of Patent: Jun. 15, 2010

(54) APPARATUS AND SYSTEM FOR DELIVERING AUDIO/VIDEO CONTENT TO A REMOTE RECEIVER

(75) Inventors: David C. Boyden, Escondido, CA (US); Ryuichi Iwamura, San Diego, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 427 days.

(21) Appl. No.: 11/481,396

(22) Filed: Jul. 3, 2006

(65) Prior Publication Data

US 2007/0022449 A1    Jan. 25, 2007

Related U.S. Application Data

(63) Continuation-in-part of application No. 10/651,684, filed on Aug. 29, 2003, now Pat. No. 7,092,693.

(51) Int. Cl.
*H04N 7/18* (2006.01)
(52) U.S. Cl. ............... 725/81; 725/95; 725/138; 725/139; 725/141
(58) Field of Classification Search .......... 725/95, 725/138, 139, 141, 144, 145, 151, 153
See application file for complete search history.

(56) References Cited

U.S. PATENT DOCUMENTS

| | | | |
|---|---|---|---|
| 3,944,723 A | 3/1976 | Fong | |
| 4,796,027 A | 1/1989 | Smith-Vaniz | |
| 5,392,223 A | 2/1995 | Caci | |
| 5,410,326 A | 4/1995 | Goldstein | |
| 5,630,204 A | 5/1997 | Hylton et al. | |
| 5,896,131 A | 4/1999 | Alexander | |
| 5,933,141 A | 8/1999 | Smith | |
| 5,949,432 A | 9/1999 | Gough et al. | |
| 6,026,086 A | 2/2000 | Lancelot et al. | |

(Continued)

FOREIGN PATENT DOCUMENTS

CN    1166122    11/1997

(Continued)

*Primary Examiner*—Christopher Kelley
*Assistant Examiner*—Mulugeta Mengesha
(74) *Attorney, Agent, or Firm*—John P. O'Banion

(57) ABSTRACT

A system for communicating content streams (e.g., voice, video, data) between a content server connected to a network and a remote electronic device. In one implementation, the network is a power-line communication (PLC) network and the remote device is configured for ultra-wide band connectivity with an interface module. The interface module is a power-line communication/ultra-wide band (PLC/UWB) module preferably connected to a conventional power outlet on the network. The interface module converts the power-line signals from the server to ultra-wide band signals which are broadcast for reception by the wireless electronic device. Return communications with the server from the wireless electronic device are also preferably supported. The power-line communication and/or ultra-wide band signal can also be encrypted for improved security. The content server and interface module are preferably configured to communicate content streams only within the portions of the bandwidth allocated by a bus master, which may be a content server with programming for controlling bandwidth use on the physical power-line communications network. In another implementation, the content is sent to the remote device over a connection to the Internet.

20 Claims, 9 Drawing Sheets

U.S. PATENT DOCUMENTS

| | | | |
|---|---|---|---|
| 6,097,441 A | 8/2000 | Allport | |
| 6,125,448 A | 9/2000 | Schwan et al. | |
| 6,243,818 B1 | 6/2001 | Schwan et al. | |
| 6,263,503 B1 | 7/2001 | Margulis | |
| 6,278,357 B1 | 8/2001 | Croushore et al. | |
| 6,396,523 B1 | 5/2002 | Segal et al. | |
| 6,417,869 B1 | 7/2002 | Do | |
| 6,466,233 B1 | 10/2002 | Mitani | |
| 6,469,633 B1 | 10/2002 | Wachter | |
| 6,492,897 B1 | 12/2002 | Mowery, Jr. | |
| 6,529,233 B1 | 3/2003 | Allen | |
| 6,567,984 B1 | 5/2003 | Allport | |
| 6,590,588 B2 | 7/2003 | Lincke et al. | |
| 6,670,970 B1 | 12/2003 | Bonura et al. | |
| 6,768,981 B2 | 7/2004 | Patterson et al. | |
| 6,842,459 B1 | 1/2005 | Binder | |
| 6,973,576 B2 * | 12/2005 | Giobbi | 713/193 |
| 7,072,932 B1 * | 7/2006 | Stahl | 709/203 |
| 7,207,055 B1 * | 4/2007 | Hendricks et al. | 725/95 |
| 7,305,560 B2 * | 12/2007 | Giobbi | 713/182 |
| 2001/0009424 A1 * | 7/2001 | Sekiguchi | 345/740 |
| 2001/0034764 A1 | 10/2001 | Nishiura | |
| 2002/0036721 A1 | 3/2002 | Sato | |
| 2002/0056082 A1 * | 5/2002 | Hull et al. | 725/1 |
| 2002/0059575 A1 * | 5/2002 | Watts et al. | 725/1 |
| 2002/0073229 A1 | 6/2002 | Hayashi | |
| 2003/0100288 A1 | 5/2003 | Tomlinson et al. | |
| 2003/0135859 A1 * | 7/2003 | Putterman et al. | 725/78 |
| 2003/0177179 A1 * | 9/2003 | Jones et al. | 709/203 |
| 2003/0221197 A1 * | 11/2003 | Fries et al. | 725/117 |
| 2003/0226149 A1 * | 12/2003 | Chun et al. | 725/78 |
| 2004/0022304 A1 * | 2/2004 | Santhoff et al. | 375/219 |
| 2004/0160990 A1 * | 8/2004 | Logvinov et al. | 370/509 |
| 2004/0183756 A1 * | 9/2004 | Freitas et al. | 345/73 |
| 2004/0268400 A1 * | 12/2004 | Barde et al. | 725/94 |
| 2004/0268407 A1 * | 12/2004 | Sparrell et al. | 725/116 |
| 2005/0089061 A1 | 4/2005 | Logvinov et al. | |
| 2005/0108760 A1 * | 5/2005 | Iwamura | 725/80 |
| 2005/0163059 A1 * | 7/2005 | Dacosta et al. | 370/252 |
| 2005/0166258 A1 * | 7/2005 | Vasilevsky et al. | 725/138 |
| 2005/0262535 A1 * | 11/2005 | Uchida et al. | 725/80 |
| 2006/0286958 A1 * | 12/2006 | Lee et al. | 455/343.1 |

FOREIGN PATENT DOCUMENTS

| | | |
|---|---|---|
| CN | 1271829 | 11/2000 |
| EP | 0805594 A2 | 11/1997 |
| EP | 0838945 A2 | 4/1998 |
| EP | 1041860 A2 | 10/2000 |
| JP | 06-141198 | 5/1994 |
| JP | 07-075030 | 3/1995 |
| JP | 07-336778 | 12/1995 |
| JP | 09-74498 | 3/1997 |
| JP | 09-298677 | 11/1997 |
| JP | 9-298775 | 11/1997 |
| JP | 11-88965 | 3/1999 |
| JP | 2000-251456 | 9/2000 |
| JP | 2000-356350 | 12/2000 |
| JP | 2001-103580 | 4/2001 |
| JP | 2001-160927 | 6/2001 |
| JP | 2002-78036 | 3/2002 |
| JP | 2003-018514 | 1/2003 |
| WO | 99/34599 A1 | 7/1999 |
| WO | WO 00/70828 A1 | 11/2000 |
| WO | WO 01/61881 A1 | 8/2001 |

* cited by examiner

APPARATUS AND SYSTEM FOR DELIVERING AUDIO/VIDEO CONTENT TO A REMOTE RECEIVER

CROSS-REFERENCE TO RELATED APPLICATIONS

This application is a continuation-in-part of U.S. application Ser. No. 10/651,684 filed on Aug. 29, 2003, published as US 2005/00447379 A1 on Mar. 3, 2005 and incorporated by reference in its entirety, now U.S. Pat. No. 7,092,693.

This application is related to U.S. application Ser. No. 10/876,233 filed on Jun. 24, 2004 and published as US 2005/0034169 A1 on Feb. 10, 2005, incorporated herein by reference in its entirety. This application is also related to U.S. application Ser. No. 10/514,971 filed on Nov. 18, 2004 and published as US 2005/0240660 A1 on Oct. 27, 2005, incorporated herein by reference in its entirety. This application is also related to U.S. application Ser. No. 11/108,531 filed on Apr. 18, 2006 and published as US 2005/0188418 A1 on Aug. 25, 2005, now U.S. Pat. No. 7,038,663, incorporated herein by reference in its entirety, which is a continuation of U.S. application Ser. No. 09/906,922 filed on Jul. 16, 2001, now U.S. Pat. No. 6,930,661, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to audio, video and data networks, and more particularly to providing audio, video and data content to and from consumer electronic devices using the electrical power wiring infrastructure of a building, or using a conventional wired or wireless LAN or WAN connected to the Internet.

2. Description of Related Art

Portable consumer electronic devices are becoming dependent in many cases on network connectivity to deliver audio and video content. The inconvenience of the cables which tether the devices to signal sources has become increasingly bothersome. Present wireless solutions address this problem, but the advantages of strictly wireless connections suffer limitations in range, bandwidth, and reliability. In addition, existing wireless solutions are not configured for cooperative operation with power-line communication (PLC) devices utilized on other virtual networks within the physical power-line communications network. It should be recognized that users of PLC networks share the bandwidth which is available from the destination-end power distribution transformer, wherein typically about five to ten or homes are connected to each power-line distribution transformer.

Existing short-range wireless standards such as IEEE 802.11a/b/g that were developed for local area networks (LAN) and Bluetooth™ developed for personal area networks (PAN) have certain inherent limitations in range, bandwidth and susceptibility to interference. For example, IEEE 802.11b operates in the 2.4 GHz ISM band and has a rated operating range of approximately 100 meters with approximately 33 Mbps total aggregate speed. Bluetooth™ has an approximate 10-meter range with 10 Mbps total aggregate speed in the low power mode.

Networks using the IEEE 802.11b standard often experience interference which can cause system crashes when certain electronic devices such as 2.4 GHz telephones are concurrently utilized. This interference is particularly challenging with regard to vertical networks which span one or more floors of a building.

One additional disadvantage to conventional fixed frequency wireless applications is the occurrence of multipath distortion due to radio waves bouncing off of objects and arriving at the receiver at slightly different times using different paths. Multipath distortion can cause dead zones and fading and can be particularly prevalent in cluttered commercial and busy home environments.

BRIEF SUMMARY OF THE INVENTION

The present invention generally comprises systems, apparatus and methods for forwarding audio/video data content to a remote user (client) device. In one embodiment, the data (i.e. audio-visual content) is distributed to client devices located in rooms of a residential or commercial structure, or other locations in which a power-line communications (PLC) network extends. In this embodiment, ultra-wide band (UWB) wireless modules are connected to the PLC network for communicating with electronic remote user (e.g., client) devices, such as laptops, PDAs, cameras, camcorders, MP3 players, and other devices having UWB connectivity that can benefit from untethered use. This embodiment is preferably configured for allocating available PLC bandwidth utilizing an allocation manager, such as one that divides the PLC bandwidth into time slots which are allocated to users as needed when sparse traffic exists, and which can equitably share available bandwidth as requests exceed available bandwidth. Wireless devices according to the present system are preferably configured for communicating with the allocation manager and operating within the constraints of the assigned allocation.

In another embodiment, data is distributed to the client devices over the Internet. In alternative embodiments, the network could be a wired or wireless network which is ultimately connected to the Internet. Conversion of the data/content signals is accomplished using conventional PLC or network adapters and communications protocols.

In one embodiment, an apparatus for forwarding audio/video data content to a remote device comprises a content server device configured for (i) receiving data content from an external source of audio data content, video data content or both audio and video data content; and (ii) transmitting the data content to a remote user device over a network.

In one embodiment, the external source of audio and video data content is selected from the group consisting of a media player, DVD, CD, PVR, DVR, STB, live feed, cable feed, satellite feed, broadcast feed, Internet connection, and high or low bandwidth telephone connection.

In one embodiment, the network comprises a PLC network. In another embodiment, the network comprises a wired or wireless LAN or WAN connected to the Internet.

In one embodiment, the content server device includes a communications interface configured for interfacing the content server device with a network. In one embodiment, the communications interface is configured for data transmission over a PLC network. In another embodiment, the communications interface is configured for data transmission over a wired or wireless LAN or WAN connected to the Internet.

An aspect of the invention is to provide communication between a audio/video content server and a remote client device.

Another aspect of the invention is to provide a system for delivering data to and from an electronic device that is virtually free from interference from radio frequency devices.

Another aspect of the invention is to provide a system for communicating data with remote devices over a bandwidth managed network.

Another aspect of the invention is to provide a communication system that overcomes the need for trading off range and security considerations.

Another aspect of the invention is to provide a communication system wherein range can be intentionally limited to within the confined space bounded by walls and floors.

Another aspect of the invention is to provide a communication system that does not suffer from multipath distortion problems.

A still further aspect of the invention is to extend the range and bandwidth of wireless devices over conventional wireless systems.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL
VIEWS OF THE DRAWING(S)

The invention will be more fully understood by reference to the following drawings which are for illustrative purposes only:

DETAILED DESCRIPTION OF THE INVENTION

Referring more specifically to the drawings, various embodiments of the invention are illustrated in the systems, apparatus and methods depicted generally as shown in FIG. 1 through FIG. 7B. It will be appreciated that the systems and apparatus may vary as to configuration and as to details of the components, and that the method(s) may vary as to the specific steps and sequence, without departing from the basic concepts as disclosed herein.

1. Combining UWB communications with PLC.

Figure 1:
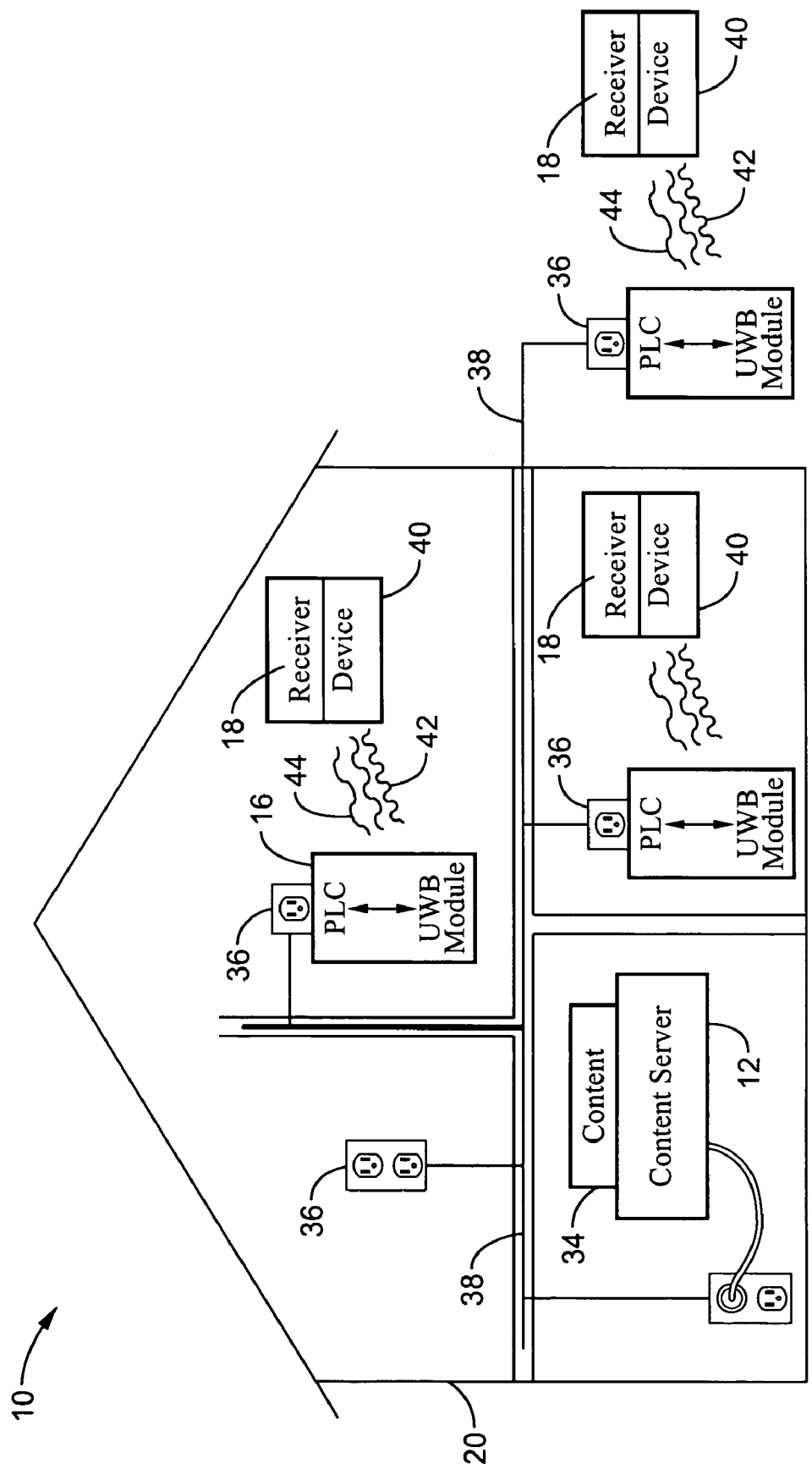
FIG. 1 is a high-level schematic view of one embodiment of the invention adapted to a residential setting.

An embodiment of the invention pairs Ultra-wide Band (UWB) communication technology with power-line communication (PLC) technology to provide a high capacity, high-speed communication stream network. In the embodiment shown in FIG. 1, the combination of the UWB and PLC technologies provides an untethered, high bandwidth connection that can reliably convey audio, video and/or data content to consumer electronic devices throughout the home. The system 10, is adapted for use in a residence as shown in FIG. 1. Although a residential dwelling is used for illustration, it will be understood that the system can be adapted for use in commercial buildings as well as in inter-building and outdoor settings with established power line outlets.

Figure 2:
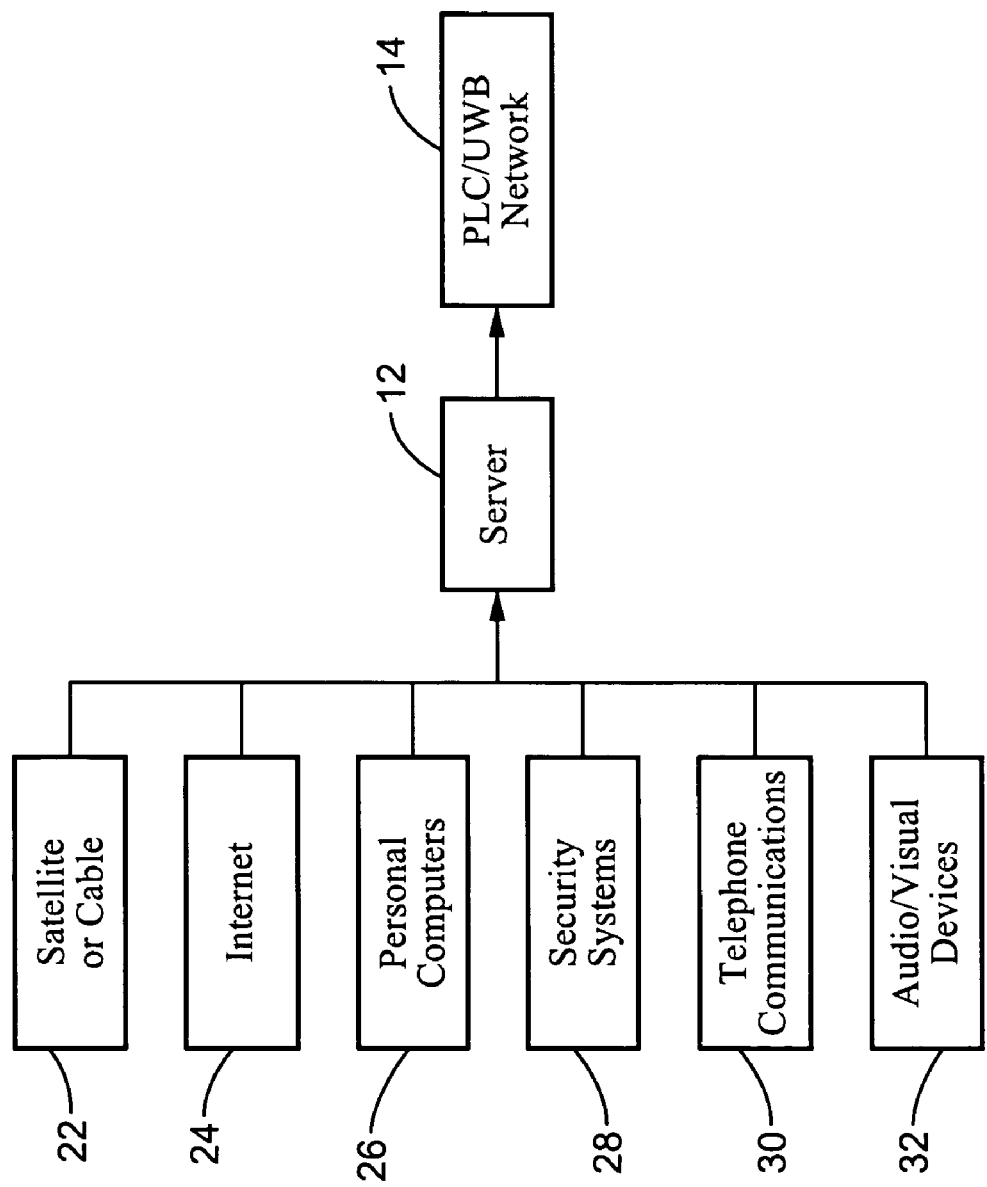
FIG. 2 is a functional block diagram of data and content sources according to one embodiment of the invention.

Referring also to FIG. 2, a data or content server device 12 is provided to receive data and other content from many different sources, and convert the signals to suitable PLC signals for transmission through a PLC/UWB network 14. Instead of a PLC network, in alternative embodiments the network could be a wired or wireless network which is ultimately connected to the Internet. Conversion of the data/content signals is accomplished using conventional PLC or network adapters and communications protocols. In the case of a PLC/UWB network, the overall network would typically include the electrical system of the building and one or more PLC/UWB modules 16 that convert PLC signals to UWB impulses and transmit those impulses to wireless devices operating in the vicinity surrounding each module 16. Receivers 18 that are specifically configured for a variety of electronic devices 40 convert the UWB impulses to appropriate signals for receipt by the wireless device. In the case of a conventional LAN, WAN or other type of network connected to the Internet, the overall network would typically include the wired or wireless IP network infrastructure and one or more client devices for receiving the data.

The system may be configured for data flows in either direction or for routing data in both directions by including transceivers in the server, PLC/UWB module, and client device. The wireless devices communicating over the ultra-wide band communication channel preferably support unit addressing within the present invention. However, due to the limited range of the ultra-wide band signals in response to attenuation created by obstructions such as walls and floors, the wireless devices can generally operate in different rooms or on different floors without interference. A number of unit addressing mechanisms and alternatively channel addressing mechanisms are known in the art and need not be described in further detail.

As seen in FIG. 2, the network of the present invention can communicate content from a wide variety of sources from both inside and outside of building 20. For example, server 12 may receive digital audio/visual signals from a satellite dish or cable provider 22. Data and Internet communications 24 over a cable, DSL, or dial-up connection or the like may also be received and sent by the server 12. Likewise, signals from a personal computer, LAN or other computer network 26 can be received and sent by the server 12 in one embodiment. It can be seen that networks can be connected with computers, computer networks or peripherals on another floor without the need for the installation of new wiring. Audio and video images and other functions can be communication to, or from, security system 28. Security personnel patrolling a building, for example, can receive images from security cameras on hand held monitors to locate intruders or other hazards without opening doors. The server 12 may also receive telephone or facsimile communications 30 through a conventional telephone line.

In addition, server 12 may be configured to receive signals from a DVD, videocassette recorder, digital camera, radio or similar video and/or audio devices 32 located inside of the building. In the illustrative example of the system 10 embodied in FIG. 1, audio-visual (AV) content may be provided by a DVD player that is appropriately connected to server 12. The content signal that is received by server 12 may be processed by the server to convert the signal, if necessary, to make the signal suitable for power-line communication (PLC) transmissions. Preferably, the signal is encrypted prior to transmission over the PLC network and signal streams may be limited to transmission within allocated portions of the bandwidth, such as within time slots. Although, alternatively the received signals may be simply retransmitted by the server 12.

In the embodiment illustrated in FIG. 1, the existing electrical infrastructure in a building is used in power-line communications (PLC) technology to carry audio, video, data, voice and other signals in a high-speed, high-capacity system. For example, PLC technology can provide broadband Internet access with throughput speeds that are faster than existing DSL and cable modems. However, each power-line network typically has highly variable levels of impedance, noise and signal attenuation due not only to the structure of the network, but also to the use of the electricity by the occupants of the building. For example, noise in a power-line network may come from the electrical lines through impedance changes as well as from electrical motors, light dimmers, power supplies and thermostats. The noise may be synchronous with the 50 Hz to 60 Hz power frequency or may be non-synchronous. The background noise is generally low level and continuous with periodic high-level noise pulses depending on the power use.

Mechanisms are preferably incorporated within the present invention for improving communication reliability and noise tolerance, such as modulating signal frequencies, repeating data packets, using forward error correction algorithms, error detection techniques (i.e. cyclic redundancy checks), and the like. Because the benefits and implementation details for these mechanisms are generally known to those of ordinary skill in the art they will not be further described.

It can be seen that any power outlet in the home or office can be a point of access for PLC signals transmitted through the electrical power system of the building from server 12. In the embodiment shown, a PLC/UWB module 16 is configured with conventional male prongs that fit into corresponding receptacles in the power socket 36 to gain access to the electrical power system 38 and the PLC signals from the server 12. Similarly, permanent PLC/UWB modules (not shown) can be installed utilizing access to the power system through light sockets or by tapping into power lines through permanent structural changes to the power system of the building.

The range of the system 10 is extended horizontally throughout each floor level as well as vertically between each of the floors of the building over the PLC network. The range of the system 10 can also be similarly extended outside of structure 20 with the server and electrical system through the use of exterior electrical lines 38 or exterior outlets 36.

The PLC/UWB module 16 is configured with an UWB transmitter, UWB receiver, or more preferably an UWB transceiver for communicated with wireless devices throughout the area surrounding module 16. Transceiver 18 of electronic device 40 can receive or send and receive communications with server 12 using UWB transmissions. In another embodiment, the PLC/UWB module includes an infrared, radio wave or similar wave return receiver that can receive transmissions from electronic devices near the PLC/UWB module for return communications with server 12.

1.1 Benefits of UWB Communications.

PLC/UWB module 16 transmissions preferably comprise very short, very low power pulses that are divided over a wide band of radio frequencies. UWB pulse-based signals do not modulate a fixed frequency carrier as with most modern radio equipment. By spreading the power of the signal over a wide band of frequencies only a minute amount of energy is radiated at any given frequency and therefore this energy appears as background noise to existing fixed frequency devices. For example, if one watt of power of a signal is divided across a 1 Ghz range of frequencies then only 1 nanowatt of power is emitted over each one Hertz portion of the frequency band. Accordingly, PLC/UWB module 16 can operate on a spectrum of licensed and unlicensed frequencies that are currently occupied by fixed frequency services without interfering with existing devices.

The UWB signal is a function of time rather than frequency. Extremely short duration pulses lasting approximately 0.5 nanoseconds or more are modulated by UWB module 16. Although millions of pulses 42 are generated each second, the short duration of the pulses keeps the duty cycle low and therefore the consumption of power is also kept low.

1.2 Pulse Modulation Schemes for UWB Communications.

Various pulse schemes may be employed to modulate UWB pulses 42 to transmit data. For example, pulse position modulation (PPM) may be used to encode information based on the position of the pulse. PPM schemes involve the placement of pulses in time and typically use the selection of a time window. Accordingly, a one-nanosecond window will allow as many as a billion pulses per second. If consecutive windows are grouped, then a pulse in one window can indicate a value of one and a pulse in the second window can indicate a value of zero. Multiple windows can be associated to define four bits or eight bits etc. Alternatively, the pulse modulation window could use the presence of a pulse to indicate a value of one and the absence of a pulse could indicate the value of a zero using on-off keying modulation.

In addition, UWB pulse windows may be grouped within the present system to form a code term that represents the value of one or zero. Coded pulses will also reduce potential confusion from the signals of multiple simultaneous users and can improve signal integrity.

The transmitted signal from PLC/UWB module 16 transmitter is collected by the UWB receiver of wireless device 40 of the user and the pulse is reconstructed. Wireless device 40 may be simply a content player that receives UWB signal 42 from PLC/UWB module 16 such as a high definition television or a radio. In the embodiment shown in FIG. 1, the users electronic device has a UWB return transmitter in addition the UWB receiver. In this embodiment, the return transmitter sends a UWB signal 44 to a receiver in PLC/UWB module 16. The PLC/UWB module 16 processes the return signal and sends the signal to server 12 through power-line network 38 of building 20. If server 12 is linked to outside communications systems, server 12 can facilitate the communication through the external link.

Another modulation scheme defines values by changing the power of the pulse. The pulse-amplitude modulation (PAM) scheme uses the amplitude of pulse to encode information. Still another modulation scheme uses the phase of the signal to determine bit value. Binary phase shift keying (BPSK) reads "forward" or "backward" pulses as ones or zeros. Although, the foregoing pulse schemes are useful, it will be understood that other modulation schemes may be used.

1.3 Encryption of Communications.

Signal encryption techniques are preferably incorporated within the system to improve system security. For example, the power-line communication signal is preferably encrypted and decrypted by server 12. Each PLC/UWB module 16 may decrypt the communications prior to unencrypted wireless transmission, or it may perform its own encryption of the signal for communication over the wide-band communication link with a remote device. It should also be appreciated that PLC/UWB module 16 may pass-through the encryption performed by server 12 over the UWB communication link for decryption by remote devices.

1.4 System Use and Variations.

It can be seen that the system of the present invention can be put to a wide variety of uses from simple audio-visual playback to more complex wireless computer and telephone uses. For example, audio-visual (AV) input from a signal source 34 can be directed to server 12 for processing and power-line transmission. The AV input is transmitted by the server through home power system 38 using PLC technology. PLC/UWB module 12 translates the PLC signaling to UWB signaling and broadcasts the UWB signal in the vicinity of module 12. The AV-content can be viewed on a portable television having a UWB receiver interface 18 in any room (or even outside the structure from an exterior outlet) that has a PLC/UWB module 12. The combination of UWB and PLC technologies provides an untethered, high bandwidth connection that can reliably convey audio/video content to consumer electronic devices throughout the home.

Server 12 and PLC/UWB modules 16 may be configured to support multiple channels, wherein different content may be communicated to different modules positioned at different locations. For example, a power point presentation and conference call can be conducted simultaneously in separate locations within a building or between buildings at separate locations. A wireless personal assistant device could execute programming on a personal computer that is linked to server 12 from a conference room in a different location from the server or the personal computer.

In addition, it should be appreciated that even the AV Server 12 could be configured for operation in an untethered mode, such as by including a battery pack and a PLC/UWB module. The PLC/UWB module in this case can be configured to accept communication from the server over the UWB link as well as over the PLC communication link. In this way the server could roam while communication still derives benefit from having at least a portion of the traffic routed over the PLC.

2. Bandwidth Contention over a PLC.

It should be appreciated that a number of entities, such as homeowners in a residential environment, or businesses (or departments of a single business) in a commercial setting, typically share a single distribution transformer. The power-line communication signals are available to all parties connecting to the secondary windings of the distribution transformer, and these parties must share the available bandwidth despite fluctuations in communication activity and available bandwidth. In a typical residential setting, approximately five to ten homes share a distribution transformer. This situation poses a security threat while leaving unresolved how the available bandwidth is to be utilized by the devices connecting to the PLC. The virtual networks can contend with one another for bandwidth, reducing the overall effectiveness of all virtual networks and in some cases it may render the PLC network unusable because devices have no assurance of gaining an equitable share of PLC bandwidth.

2.1 System PLC Bandwidth Management.

The present invention preferably incorporates bandwidth management into content server 12 and PLC/UWB modules 16, so that each entity is provided a virtual network on the physical network bounded by the distribution transformer. To provide fair bandwidth utilization, the servers controlling separate virtual networks sharing the physical network of the power-line communications network must cooperate in controlling the use of bandwidth within their respective virtual networks. PLC bandwidth is allocated to each virtual network on an equitable basis providing an assurance that streams, in particular the highest priority streams, will be accorded some bandwidth for communicating with remote devices, such as PLC/UWB modules 16 which communicate wirelessly over the last leg with remote devices. It will be appreciated that one device on the PLC network, which is generally considered a server and referred to in the following discussion as the "bus master", is configured for allocating bandwidth to devices operating over the PLC network. Concurrently each device connected to the PLC network, along with any additional servers connected to the PLC, are configured according to this aspect of the invention to utilize the bandwidth allocated by the bus master. Each PLC/UWB module 16, therefore, is preferably configured with circuitry for utilizing bandwidth according to the direction of the bus master. It should be appreciated that the following description provides an illustrative example of bandwidth allocation within a system that communicates over a combination of PLC and UWB communication links, whose specific implementations may be modified by one of ordinary skill in the art without departing from the teachings of the present invention.

The invention is configured to provide bandwidth management despite the effects of power-line noise and unstable conditions on the power line. One preferred implementation of the system is based on orthogonal frequency division multiplexing (OFDM) technology. To establish stable connections on an unstable power-line medium, each device on the power-line exchanges carrier information and best carriers are chosen each time a communication is executed. Bandwidth is preferably managed based on time division multiple access (TDMA) mechanism, wherein bandwidth is parceled out as time slot portions of the bandwidth. It should be appreciated that bandwidth may be alternatively distributed as frequency ranges, or a combination of frequency ranges and time slots, or other forms of packetizing available bandwidth for use by streams. These alternative bandwidth distribution mechanisms may be adopted without departing from the teachings of the present invention.

To simplify coordination between servers, the present system is preferably configured to designate one of the servers, operating on the physical network bounded by the distribution transformer, as a bus master. No special monopolistic operations are accorded to the bus master and bus master selection may be determined in any convenient manner. In the present embodiment, upon connecting a server to the power-line system, the server attempts to detect the presence of a bus master. If no bus master is found, then the newly connected server takes on the role of bus master. Upon disconnection of an active master, another device operating on the power-line network will become the new bus master. The master functions (according to a TDMA implementation) to split the time axis into fixed length cycle frames, with each frame including a fixed number of time slots.

The bus master preferably splits the available access time into fixed length time cycles. A time cycle is divided to a fixed number of time slots, for example, 100 time slots. The master assigns one of more time slots to each stream. The time slot(s) will be used for the stream every cycle until the stream terminates. Prior to commencing a stream a sender preferably requests time slots from the master. Since timing is critical on isochronous streams, at least a certain number of time slots are reserved for it. If bandwidth permits, then every stream obtains sufficient time slots as requested to suit optimal operation, because sufficient time slots are available for allocation by the master. However, if insufficient bandwidth exists for all streams, then the master reassigns time slots to accomplish fair sharing between the virtual networks within the stream group priorities. The master implemented according to the present invention, therefore, reassigns time slots in an equitable sharing arrangement for use by streams communicating within each virtual network sharing the power line.

2.2 Server.

Any server (or intelligent device) communicating over the PLC network which has adequate processing power and programming for executing bus master functionality, such as described according to the invention, can operate as the bus master. For example, the bus master may comprise a personal computer, media server, set-top box (STB), personal video recorder (PVR), digital video recorder (DVR), television set, or other device configured for executing bus master program code and supporting PLC network connectivity. By way of example a media server may comprise a PLC interface with bandwidth control circuits, a central processing unit and memory adapted for executing bus master programming, along with other optional elements such as a hard disk drive for storing media, a user interface for collecting user preferences in controlling the media server and displaying status and/or media content, a video and/or audio tuner, and a modem or network interface for communicating over telephone lines, cable connections, LANs, and so forth.

To ensure security of the virtual network connections over the physical power-line distribution network which is typically bounded by a distribution transformer, the PLC interface preferably includes an encryption/decryption unit.

2.3 PLC/UWB Module Client.

Figure 3:
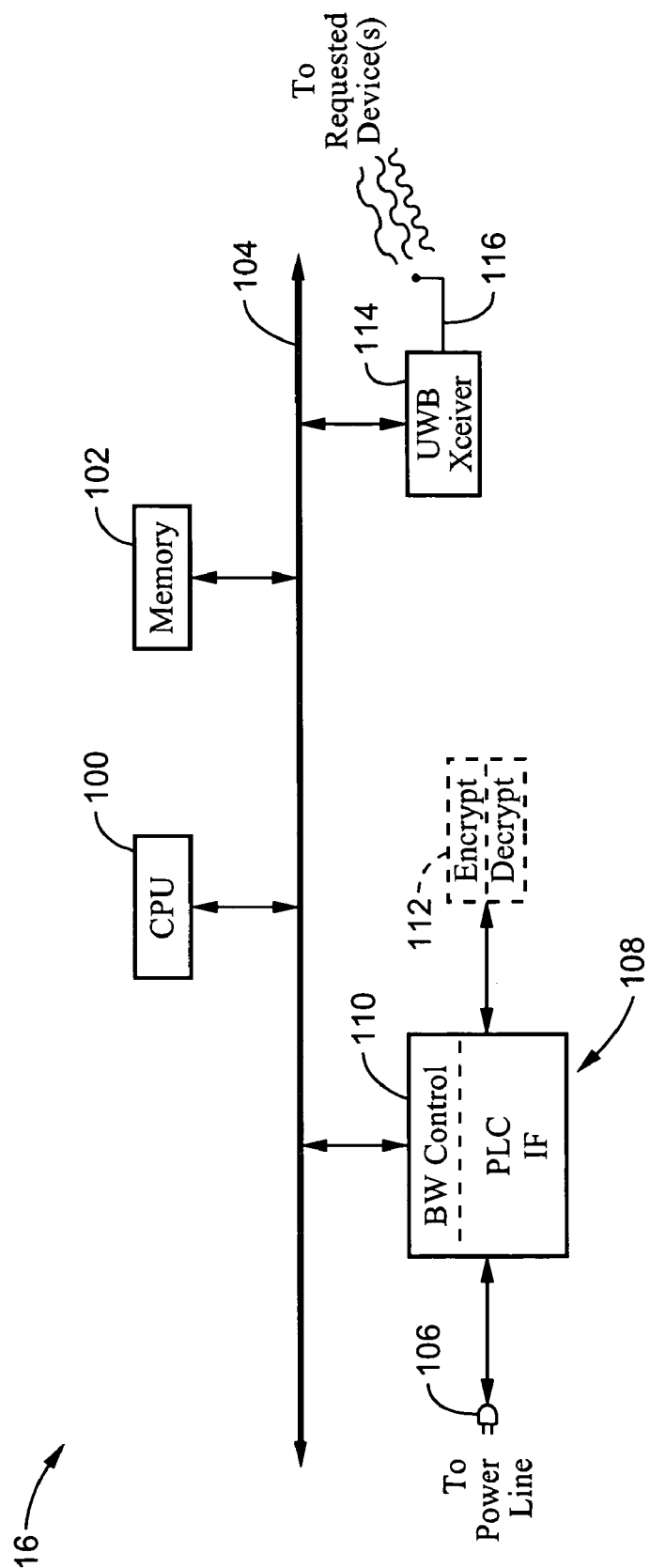
FIG. 3 is a block diagram of a PLC/UWB modules according to an aspect of the present invention, shown with allocation bandwidth control circuitry within the PLC interface.

FIG. 3 depicts functionality within a representative PLC/UWB module 16 which operates as a client of the bus master. A central processor 100 in combination with memory 102 is shown connected through a local bus 104 for controlling additional circuitry. A power-line connection 106 is shown connecting to a power-line controller (PLC) interface 108, shown with an allocation bandwidth controller circuit 110 for following the bandwidth allocations determined by the bus master. An optional encryption/decryption unit 112 which provides a measure of security for data passed over a virtual network. An UWB transmitter, or transceiver 114, is shown with antenna 116 for providing connectivity with wireless devices.

2.4 Allocation of Bandwidth.

The data being passed over the PLC network is generally referred to as a "stream", because typically it comprises an audio and/or video stream. Although other forms of data may be passed in conjunction with or as an alternative to a stream. Stream data may be generally considered isochronous, asynchronous, or a combination of the two. Prior to stream transmission, a transmitter requests from the bus master sufficient time slots to send the stream. The request must be handled by the master as it manages the allocations of the available time slots. The master returns a response to inform the transmitter of the time slots it is being assigned. The transmitter commences stream transmission using the assigned time slots. It will be appreciated that the master adjusts the slots available for assignment in response to changes in available bandwidth, requests for bandwidth, and prioritization of bandwidth requests. The client, in this case PLC/UWB module 16, is configured with a means for utilizing the designated bandwidth allocated by the bus master. For example TDMA circuits can be configured for communicating on selected time slots in response to a time slot assignment from the bus master.

The present allocation methods preferably perform bandwidth reallocation in order to maintain equitable bandwidth sharing. For example, as the bus becomes so busy in response to bandwidth requests that not all bandwidth requests can be simultaneously fulfilled, then the bus master may assign fewer time slots to a stream than requested by the transmitter. In this case, the transmitter must adjust its data encoding rate to fit the given bandwidth, or alternately delay the transmissions. After the transmitter terminates the stream, it informs the master that the given time slots are no longer in use, whereas the master reassigns the time slots to other streams. For slot management communications, one or more time slots may be reserved and are thus not available at any time for carrying isochronous or asynchronous streams. The following sections describe how the master manages time slots.

3. Time Slot Reassignment Algorithm.

3.1 Priority Groups.

Before a device transmits a new stream, it requests time slot assignments from the master. In response, the master assigns time slots to the device, yet is not always able to assign the number of time slots requested by the transmitting device. If insufficient time slots are available for use, then the master reassigns slots based on the network priority and the priority of the stream.

By way of example, the present invention may be configured with four priority levels, group A, B, C and D. Group A has the highest priority and group D has the lowest. An isochronous stream is categorized to group A or B, while an asynchronous stream is categorized to group C or D. For example, VoIP (Voice over internet protocol) and a live-recording audio or video stream are categorized in group A. It will be appreciated that since it is impossible to retrieve live-recording data, it should be given the highest priority. A playback audio/video stream is considered to be in group B. Web accesses are provided for in group C, while file transfer are considered to be in group D. It should be recognized that different implementations of the system may define these priority groups in different ways without departing from the teachings of the present invention. The present invention is preferably configured for allocating a guaranteed minimum number of time slots for a request according to each group under any condition so that even low priority streams are regularly serviced, albeit with a small bandwidth allocation.

3.2 PLC Network Priority.

Several virtual networks may operate on a single physical power-line network, as a number of homes may share a given power distribution transformer. The practice of allocating bandwidth on a first-come, first-serve basis is not equitable in the present PLC network application or in similar situations of overlapping virtual networks, because the first user may monopolize more than their fair share of the bandwidth constraining the operation of peers attempting to communicate over the network. Consider an example, wherein a first home is utilizing 95% of the entire power-line bandwidth, as a second home accesses the network and requires 20% of the bandwidth. Under a first-come first-serve basis the user at the first home may continue to monopolize the bandwidth, while the second home is unable to obtain sufficient bandwidth for their desired operation.

In contrast, the present invention fairly allocates bandwidth to solve this problem. Time slot portions of the bandwidth are assigned according to need up to an equal share of available bandwidth, after which available bandwidth is divided equally among those requesting additional bandwidth. Reallocations are performed to dynamically adjust bandwidth allocation in response to new bandwidth requests, stream terminations, overall physical network bandwidth changes, and so forth.

3.3 Time Slot Reassignment.

The method of allocating bandwidth within the present invention is based on time slots which can be assigned or reassigned to each request on the virtual network. The time slots are preferably allocated in response to the priority of the data (i.e. stream) to be transmitted. The assignment/reassignment is performed within the present invention by a time slot reassignment algorithm which is substantially applied independently to each priority group.

Parameters are input to the algorithm, preferably including:
 (a) requested number of time slots per each stream;
 (b) priority group name of each stream (i.e. group A, B or Q);
 (c) targeted total number of slots for each group.

The algorithm returns:
 (a) reassigned slot number for each stream;
 (b) total number of slots for each group allocated as equal to or less than the targeted number.

If insufficient time slots are available to meet the requirements for the group, then a time slot reduction is performed. In this case all or some of the streams are then assigned fewer time slots than have been requested. When slot reduction is required, the master is configured to preferably send a command/notification of the time slot reductions to the stream transmitter. When the stream is rate adjustable, such as for certain audio or video streams, the transmitter reduces the encoding rate to fit the new narrower available bandwidth (according to the fewer time slots allotted) thus providing graceful degradation in response to lowered bandwidth. When a stream is not rate adjustable, for example an asynchronous stream, no rate adjustment is performed, because the reduction in available time slots only causes a slowdown or a halt in the stream transfer.

Parameters of the time slot reassignment algorithm may be defined as follows:
 k—total network number;
 i—network index ($0 \leq i < k$);
 j—stream index ($0 \leq j < strm(i)$);
 T—targeted total slot number;
 p—number of streams with no reduction (i.e. r(i)=1);
 strm(i)—total stream number on network i;
 r(i)—reduction ratio of network i ($0 \leq r(i) \leq 1$),
  If r(i) is 1, no reduction performed;
 s(i,j)—slot number originally requested by stream j on network i;
 U(i)—slot number originally requested by network I;

$$U(i) = \sum_{j=0}^{Strm(k)} s(i, j)$$

$\delta(x,y)$: Kronecker's delta function
 $\delta(x,y)=1$ if $x=y$;
 $\delta(x,y)=0$ if $x \neq y$;
min(x,y): minimum function
 min(x,y)=x if $x \leq y$;
 min(x,y)=y if $x > y$;

$$T = \sum_{i=0}^{k-1} r(i)U(i)$$

Figure 4:
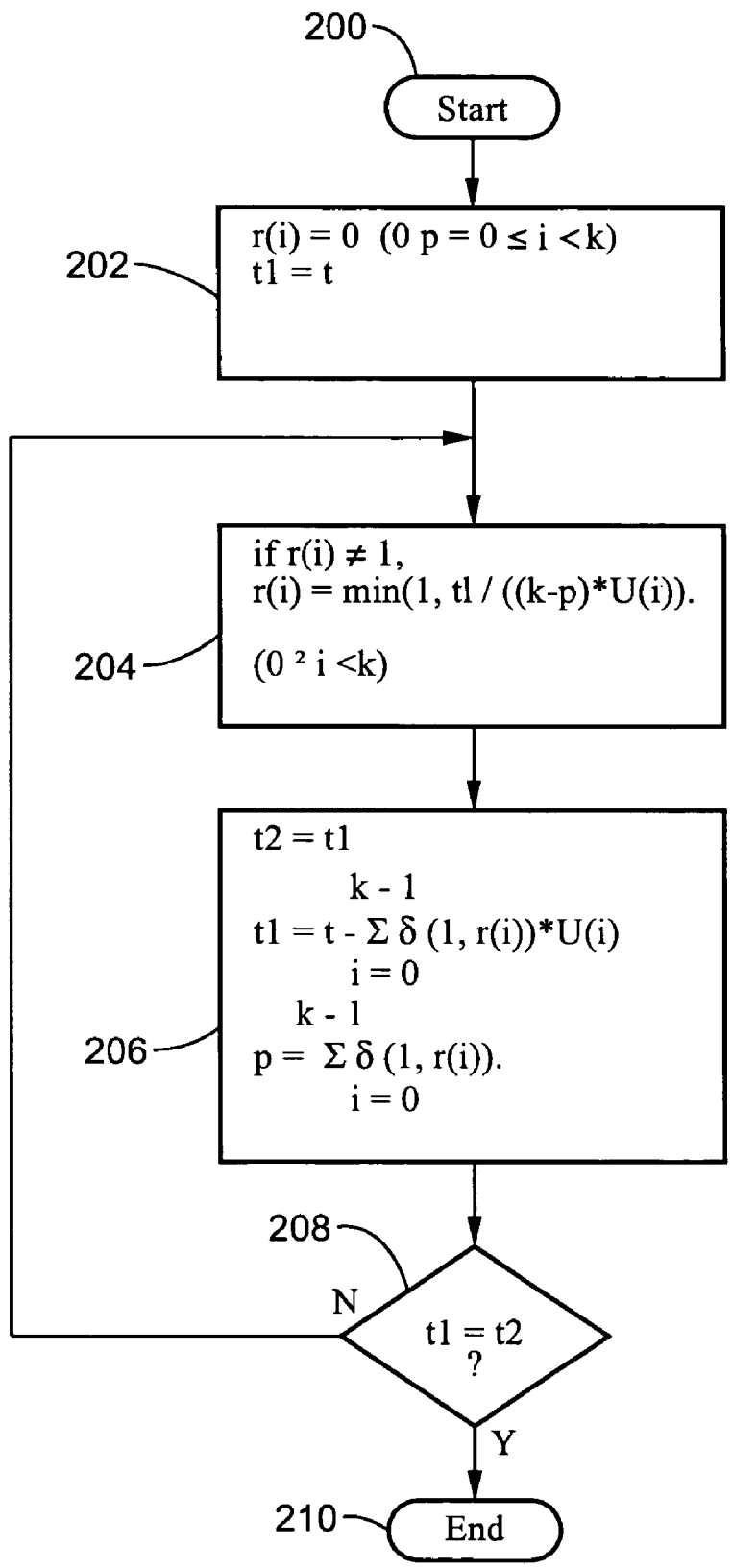
FIG. 4 is a flowchart depicting slot reassignment according to an aspect of the present invention.

FIG. 4 illustrates an example of slot reassignment. After commencing to execute the procedure at block 200, the variables r(i), p, and t1 are initialized at block 202. The value r(i), is then determined as represented by block 204, with values t1, t2, and p being determined as per block 206. The values of t1 and t2 are compared as per block 208, with execution completing at block 210 if t1=t2, or blocks 204, 206 repeated until t1=t2.

3.4 Examples of Time Slot Reassignment within a Priority Group.

The following examples are provided as an aid to understanding the reassignment process within a priority group. Consider a scenario (case) in which three homes (each with its own virtual network n0, n1, and n2) share a power-line distribution system (k=3). Assume now that ninety time slots (90) are assigned to group A, and the targeted total slot number, T, is ninety (90). In response to busy traffic conditions on virtual networks n0, n1, and n2, thirty (30) time slots should be assigned to each virtual network. It will be appreciated, therefore, that time slot allocations within each priority group are managed across the breadth of virtual networks which share the bandwidth of the physical network, such as the last-leg of the power-distribution system in the case of a PLC network. Additional cases are outlined below in which reassignment is considered.

3.4.1 Case 1.

The three networks request slots as follows: n0=30 slots, n1=25 slots, and n2=20 slots. Because the total number of slots requested, 75, is less than the number of slots available, 90, the three networks all obtain the number of slots requested and no slot reduction is performed.

3.4.2 Case 2.

The three networks request slots as follows: n0=50 slots, n1=20 slots, and n2=15 slots. Although network n0 requests the majority of time slots, 50, the total number of time slots requested is still below the available time slots, 90, wherein network n0 is provided with the requested 50 time slots, while the other networks are accorded their requested number of time slots. It should be appreciated that uncommitted extra time slots may be allocated to a network beyond those within the quota.

3.4.3 Case 3.

The three networks request slots as follows: n0=50 slots, n1=25 slots, and n2=20 slots. Network n0 again requests the majority of time slots, 50, and the total number of time slots requested is now beyond the available time slots, 90. A fair allocation of the available 90 time slots would give each virtual network 30 time slots as an equitable "quota". As insufficient bandwidth exists to fulfill all requested time slots, and because network n0 is exceeding its time slot quota, 5 time slots are taken from network n0, so that the traffic fits within the available bandwidth.

The reassigned time slots would be as follows: n0=45 slots, n1=25 slots, and n2=20 slots. It should be appreciated that the bandwidth provided to virtual network n0, is only ten percent less than the number requested, so for example if 5 Mbps video stream traffic were being sent on n0, then the adjusted rate would be dropped to 4.5 Mbps. It should be recognized that this total data rate for n0 comprises a total bandwidth associated with one or more streams, for example one stream may have utilized 30 time slots while another stream utilized 20 time slots.

3.4.4 Case 4.

The three networks request slots as follows: n0=50 slots, n1=40 slots, n2=20 slots. The total requested time slots in this case are 110, which exceeds the available 90 time slots. Virtual networks n0 and n1 both exceed their fair share quota of 90/3=30, while n2 requests only 20 time slots, which is below its quota of 30 for this situation. The system allocates the 20 time slots to n2 and splits the remaining bandwidth equally between the two virtual networks that are requesting more than their fair share (quota) of the available bandwidth. Therefore, n0 and n1 each receive (90−20)/2 time slots, with allocations being as follows: n0=55 slots, n1=55 slots, and n2=20 slots.

It should be appreciated from these examples and the associated discussion that the present invention can equitably share the available bandwidth amongst a number of virtual networks. The time slot allocations are described by way of example, and the method may utilize different criterion for sharing, including various forms of weighting, without departing from the teachings of the present invention.

3.5 Additional Aspects of Time Slot Reassignment.

The system is preferably configured for supporting fixed-rate (non-scalable) streams, wherein a transmitter can prohibit the master from applying slot reduction to the stream. Reducing the transfer rate of a fixed-rate stream can disrupt the ability to utilize the stream. Therefore, in adjusting bandwidth allocation, the system is configured to selectively apply slot reduction to scalable streams and asynchronous streams.

The master is also configured so that it may refuse reassigning time slots to accommodate a new stream when the bus is already busy. The minimum slots for each priority group are preferably allocated at a fixed place in a cycle frame. For isochronous streams, the master assigns consecutive slots, with the remaining fragmented time slots being allocated for asynchronous streams.

4. Bandwidth Management Algorithm.

4.1 Time slot management for a New Stream.

Allocation of time slots within a given priority group has been described, which is extended to an embodiment of the invention for allocating time slots between priority groups. When a transmitter is in need of sending a stream to another device, the transmitter requests sufficient time slots from the master for sending the stream. If the bus is not busy and the slots are available, the transmitter is allocated the requested slots. However, if the bus is busy and not enough slots are available, then the master reassigns time slots based on priority to accommodate the new transmissions.

Figure 5A:
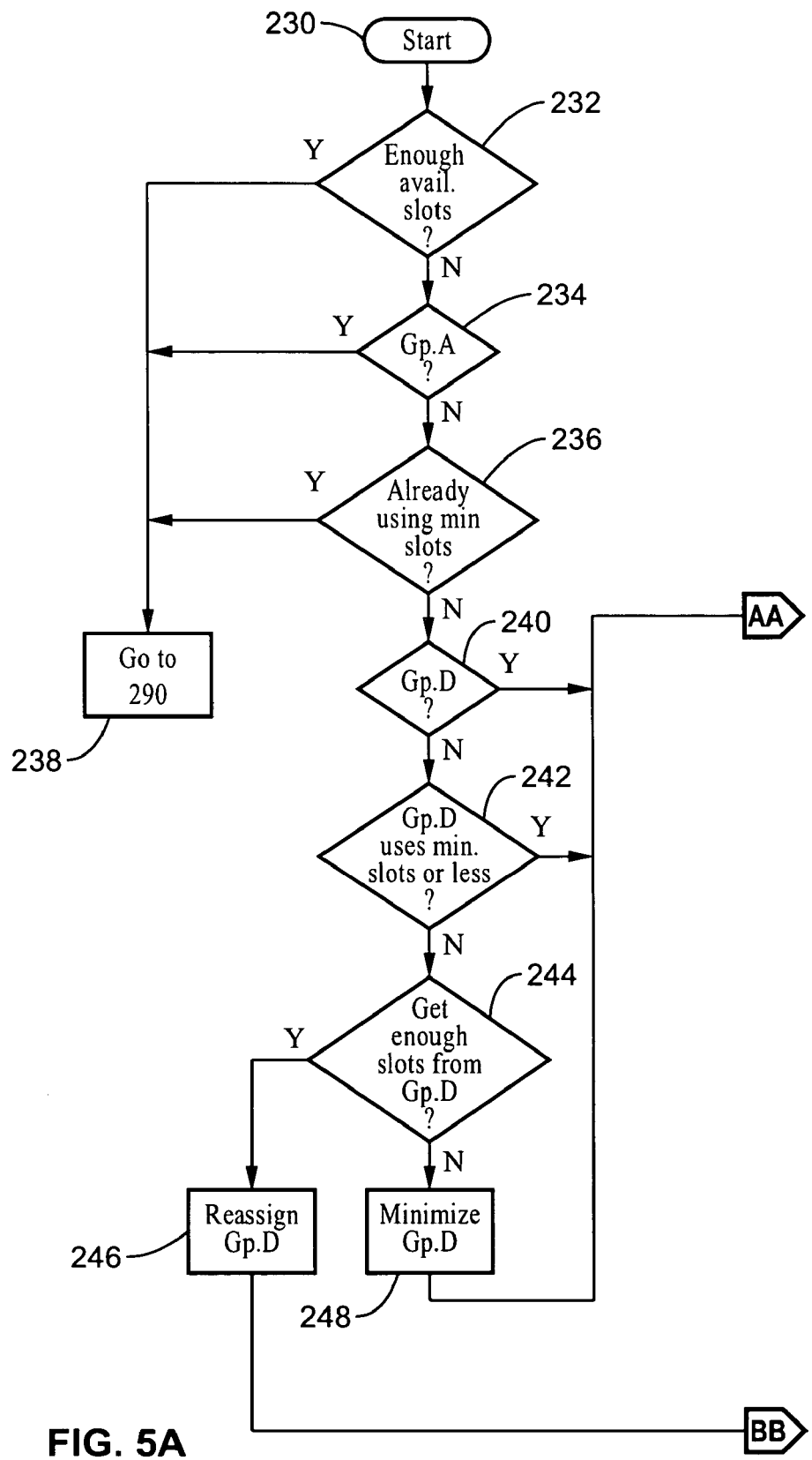
FIG. 5A is a flowchart depicting an unused timeslot recovery process within bandwidth management programming for a power-line communications network according to an aspect of the present invention.
Figure 5B:
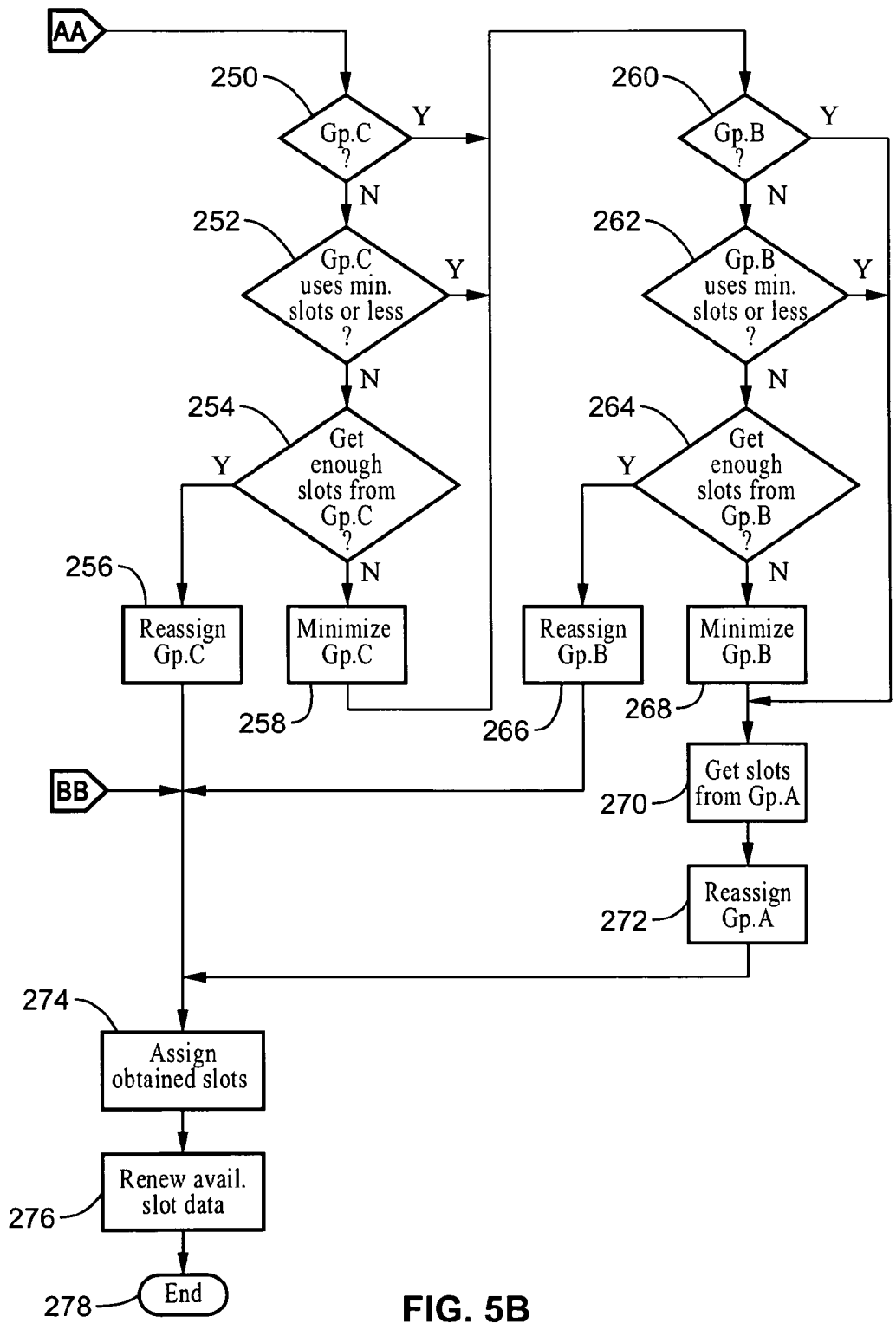
FIG. 5B is a flowchart continuing the program logic of FIG. 5A.

FIG. 5A and FIG. 5B illustrate an example of minimum slot assignment programming wherein unused timeslots are recovered from priority groups that are not utilizing their minimum time slot allocations. In this process if insufficient bandwidth exists to fulfill all requests, then streams only retain their minimum slot allocation when those slots are used, the unused slots being reclaimed for use by other priority groups.

The blocks labeled "Reassign of Gp. X" and "Minimize of Gp. X" are performed by executing the slot reassignment algorithm described previously, wherein X is selected within the set of groups {A, B, C, D}.

Figure 6:
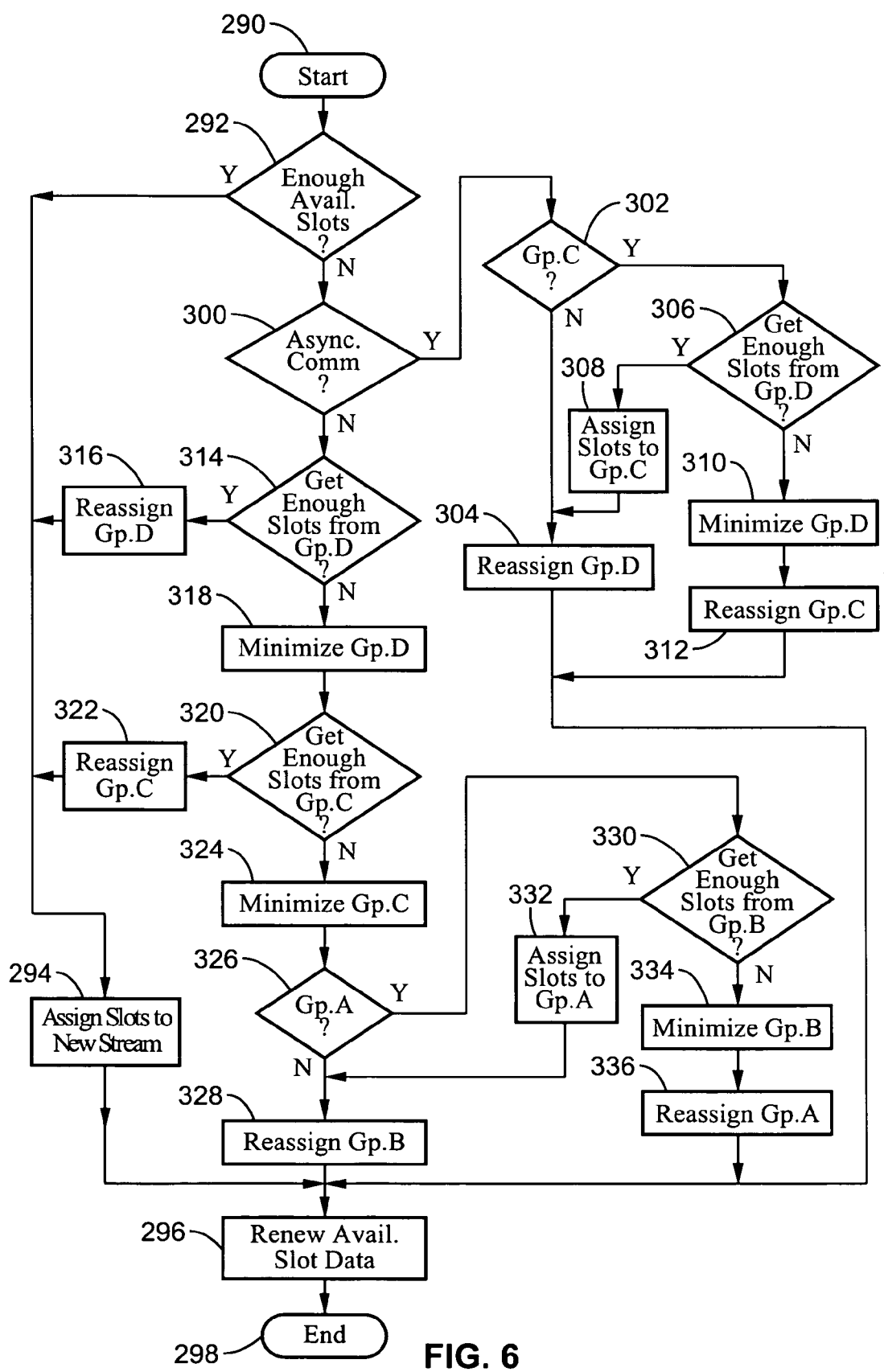
FIG. 6 is a flowchart depicting a slot allocation process within bandwidth management programming for a power-line communications network according to an aspect of the present invention.

After a request for transmitting a new stream, execution of the minimum slots assignment is performed and if required, the bandwidth management programming commences as represented at block 230, and it is determined at block 232 if sufficient time slots are available to fulfill all the bandwidth requests. If sufficient bandwidth exists, then block 238 is executed and the algorithm shown in FIG. 6 is performed from block 290.

If it is determined at block 232 that insufficient time slots exist to accommodate all requests, then the nature of the new stream request is checked as per block 234. If the request falls into group A, block 238 is executed. If the request is not group A, block 236 is executed to determine if the group is already using the minimum or more slots, wherein block 238 is executed linking to FIG. 6. If the minimum slots are not being used, block 240 checks for a group D request, which is routed to block 250 is performed to check for group C and so forth. However, if it is another group (B or C), then block 242 is performed to determine if group D is utilizing a number of slots that is less than or equal to the minimum slots allocation.

At block 242, if group D is found to utilize more than the minimum slots, block 244 is executed with slots being obtained. If enough slots can be obtained from group D, reduced slots are reassigned to group D at block 246. After block 246, obtained slots are assigned to the group at block 274 and the available slot data is renewed at block 276, with the process ending as represented by block 278.

If insufficient slots are obtained as per block 244, the allocation of slots for group D is minimized at block 248 and block 250 is executed to get slots from another group.

Block 250 to 258 and block 260 to 268 are similar to block 240 to 248. From the lowest prioritized group D to the highest prioritized group B, slots exceeded the minimum number are assigned for the new stream.

If enough slots are not available from any of group D, C and/or B, slots are taken from group A. Slots are taken from group A as represented by block 270 to obtain the minimum slots, and reduced slots are re-assigned to group A at block 272. Obtained slots are assigned to the group at block 274. The available slot data is renewed at block 276 and the process ends at block 278.

It should be appreciated that utilizing the above algorithm the minimum number of slots do not have to be reserved for group B, C and D when no streams are being sent at that priority.

FIG. 6 illustrates an example of bandwidth management programming being executed according to the present invention, which extends from the flowchart in FIG. 5A at block 238.

The blocks labeled "Reassign of Gp. X" and "Minimize of Gp. X" are performed by executing the slot reassignment algorithm described previously, wherein X is selected within the set of groups {A, B, C, D}. After a request for transmitting a new stream is received, unused slots are recovered from minimum slot assignments for use by a stream, and if more slots are required then slot priorities are taken into account in a slot allocation process which commences at block 290. It is determined at block 292 if sufficient time slots are available to fulfill all the bandwidth requests. If sufficient bandwidth exists then block 294 is executed assigning the requested number of time slots to the new stream, and the available slot information is renewed as represented by block 296, after which the algorithm exits as per block 298.

If it is determined at block 292 that insufficient time slots exist to accommodate all requests, then the nature of the new stream request is checked as per block 300. If the new stream is associated with an asynchronous communication (group C or D), then a check is made for a group C stream as represented by block 302. If it is not a group C stream, and is thereby a group D stream, then the available group D time slots are reassigned as per block 304 to equitably share them with this new stream. For a group C stream a check is performed at block 306 to determine if sufficient time slots can be taken from group D streams. If enough time slots exist then they are assigned as per block 308 and the group D time slots are reassigned as per block 304. If insufficient group D time slots exist, then group D time slots are minimized as per block 310 and the freed-up time slots are used along with reassigning group C time slots to give an equitable share of the time slots to the new stream.

If the new stream is not associated with an asynchronous communication (i.e. a group A or B request) then execution continues at block 314, wherein it is determined if time slots are available which may be taken from group D allocations. If sufficient time slots do exist, then a sufficient number of the group D time slots are reassigned from the group D time slots, as depicted by block 316, and assigned to the new stream as per block 294. If sufficient Group D time slots are not available, then the group D assignments are minimized at block 318, leaving any additional time slots freed-up for reassignment.

If sufficient time slots are not available from group D streams, a check is performed at block 320 determining if time slots are available from the group C time slots, that when combined with any freed-up group D time slots can fulfill the request from the new stream. If sufficient slots are available above the minimum time slots for group C as detected at block 320, along with those taken from group D at block 318, then these slots are reassigned as per block 322 and assigned to the new stream as per block 294. Otherwise, group C assignments are minimized as per block 324 freeing up additional time slots for reassignment.

A determination is performed as to whether the request is a group A request as per block 326, wherein if it is not a group A request, then execution continues at block 328 for the group B request wherein time slots are reassigned to group B from those freed-up from both group C and D streams. If insufficient slots are freed-up to fulfill group B time slot requests, then slot reduction will occur, because time slots may not be taken from the higher priority group A streams.

If the request was for a group A stream, as determined at block 326, then execution continues at block 330, wherein it is determined if sufficient time slots exist above the minimum within group B. If sufficient additional time slots may be freed-up from group B to fulfill the request, then they are assigned to slots in group A at block 332 and if sufficient blocks exist then reassignment of time slots freed-up within groups B, C, and D occurs at block 328. If insufficient time slots exist as determined at block 330, then the time slots for group B are minimized at block 334, and the time slots collected from groups B, C, and D are utilized in combination with slot reduction to reassign time slot within group A as per block 336.

4.2 Examples of Time Slot Management for a New Stream.

The following examples are provided by way of example to aid in understanding allocation of time slots for a new stream. Presume for this discussion that the minimum allocated slots for each group is given by: B: 80, C: 10; D: 5, as shown in Table 1. It should be noted that time slot minimums are not specified for priority group A because this group has the highest priority. Assuming further that the total available bandwidth under a given condition is 250 slots.

4.2.1 Case 1.

Group A is initially utilizing all of the 250 slots. A transmitter wants to start a new group D stream that requires 5 slots. The minimum slot allocation for group D is 5 slots and group D thereby obtains 5 time slots from group A. Group A is given 245 slots and reduction is performed to fit 245 slots. The time slot requests and allocations both before and after the process are listed in Table 2. The reduction ratio is 245/250. The execution path is described within the flowchart of FIG. 5A and FIG. 5B traversing blocks: 230, 232, 234, 236, 240, 250, 252, 260, 262, 270, 272, 274, 276, and 278.

4.2.2 Case 2.

Group A, C and D are using 230, 15 and 5 slots respectively. A transmitter will start a group B stream that requires 40 slots. The minimum slot numbers for group B is 80 and group D uses the minimum number of slots. Group C uses more than the minimum of 10 slots, but group B cannot obtain enough slots from group C. Therefore, group B obtains 40 slots from a combination of both group A and group B. The time slot requests and allocations both before and after the process are listed in Table 3. The execution path is described within the flowchart of FIG. 5A and FIG. 5B traversing blocks: 230, 232, 234, 236, 240, 242, 250, 252, 254, 258, 260, 270, 272, 274, 276, and 278.

4.2.3 Case 3.

This is a case in which a new group B stream (or streams) requires 100 slots under the same condition as case 2. Group B is assigned 80 slots taken from group A and group C. The time slot requests and allocations both before and after the process are listed in Table 4. The execution path is the same as in case 2 above, however, slot reduction is performed at block 274. The resultant slot reduction ratio is 80/100.

4.2.4 Case 4.

Assume in the following examples that each group is currently assigned time slots as follows: A: 120; B: 100; C: 15; D: 10. It should be noted that 245 time slots in total are utilized with an extra 5 time slots available for use.

A transmitter wanting to send a new group D stream sends a request for 10 time slots to the master. In response to this event the 5 remaining slots are assigned for this stream, no other time slots are assigned. The total requested time slots for group D is now 10+10=20, although only 15 time slots are available. Therefore, the group D streams are configured to equally utilize the available 15 time slots. The path is described within the flowchart of FIGS. 5A and 6 traversing blocks: 230, 232, 234, 236, 238, 290, 292, 300, 302, 304, 296, 298. The time slot assignments before and after the reassignment described above are shown in Table 5. As a consequence of the new stream being a group D stream, the number of time slots assigned to group A, B, and C does not change.

4.2.5 Case 5.

A transmitter is required to send a new group C stream and requests 20 time slots from the master. In response to this event the 5 remaining slots are thereby assigned from group C, yet 15 more time slots are required to fulfill the request. Group D currently utilizes 10 time slots, and utilization is reduced to its minimum level of 5 time slots, thus freeing up 5 additional time slots. Time slots can not be reduced from groups B and A as these are at a higher priority. Therefore, only 10 additional time slots are assigned to group C, and the new total of 25 time slots allocated for group C are shared between the existing stream(s) and the new stream, utilizing slot reduction. The path is described within the flowchart of FIGS. 5A and 6 traversing blocks: 230, 232, 234, 236, 238, 290, 292, 300, 302, 306, 310, 312, 296, 298. The time slot assignments before and after the reassignment described above are shown in Table 6. Note that the number of time slots utilized for groups A, and B did not change.

4.2.6 Case 6.

A transmitter is required to communicate a new group B stream and requests 20 more time slots from the master. In response to this event the remaining 5 time slots are first assigned to group B for the stream, then group D time slots are reduced to a minimum, and since more time slots are still needed, group C time slots are also reduced to the minimum, with five time slots being taken from each. In the aggregate 15 time slots are thus added for group B. As no more time slots are available, since group A time slots are at a higher priority and should not be taken, the 115 time slots allocated to group B are then shared between the original streams and the new stream. The path is described within the flowchart of FIGS. 5A and 6 traversing blocks: 230, 232, 234, 236, 238, 290, 292, 300, 314, 318, 320, 324, 326, 328, 296, 298. The time slot assignments before and after the reassignment described above are as shown in Table 7. Note that no change occurred in group A time slot assignments.

4.2.7 Case 7.

A transmitter is required to communicate a new group A stream and requests 33 time slots from the master. In response to this event, the 5 remaining time slots are first assigned to the new stream, the time slots utilized by group D are minimized, and since enough new time slots are still not available, the number of time slots for group C are also minimized. The aggregate extra time slots made available is now at 15, with 18 additional time slots needed. These 18 time slots are taken from group B, dropping group B time slots from 100 down to 82. The group B streams must then share the streams 82 allocated to them, which is a rate reduction from the original one hundred aggregate time slots requested. This slot reduction is preferably facilitated by rate-adjustment within the streams as previously described. A total of 33 time slots have thus been freed-up wherein group A can transmit the new stream without rate reductions. The execution path is described within the flowchart of FIGS. 5A and 6 traversing blocks: 230, 232, 234, 236, 238, 290, 292, 300, 314, 318, 320, 324, 326, 330, 332, 328, 296, 298. The time slot assignments before and after the reassignment described above are shown in Table 8.

4.3 Time Slot Management After Stream Termination.

The previous section explained aggregating time slots for assignment in association with a new stream, whereas this section describes time slot management after a stream terminates. When a stream terminates, the time slots utilized by that stream will be released, and the newly available slots may be reassigned to the other on-going streams based on group priorities. The released time slots being made available to groups in the prioritized order of group A, group B, group C, and lastly group D.

Figure 7A:
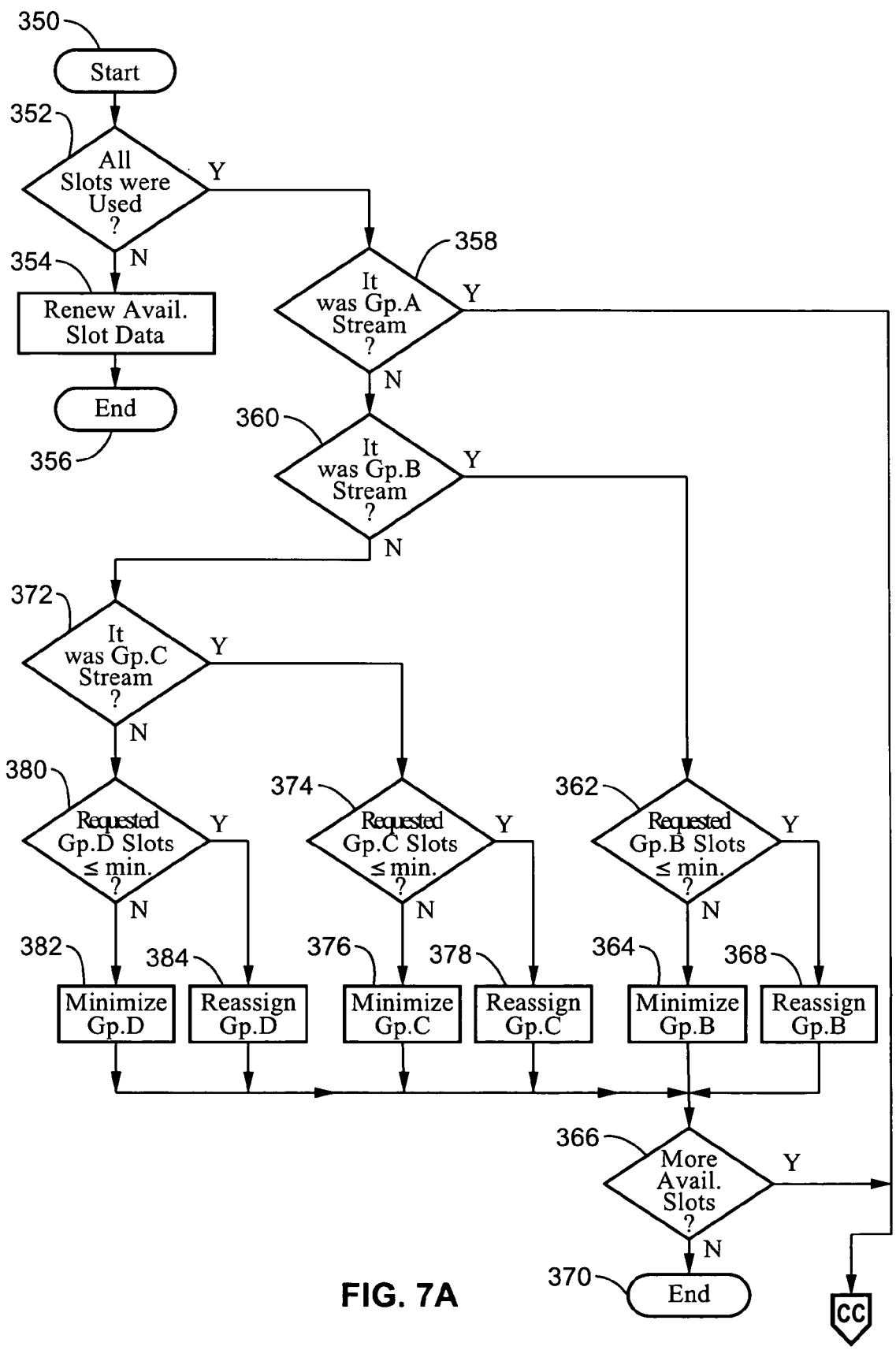
FIG. 7A is a flowchart depicting reassignment of time slots after stream terminations according to an aspect of the present invention.
Figure 7B:
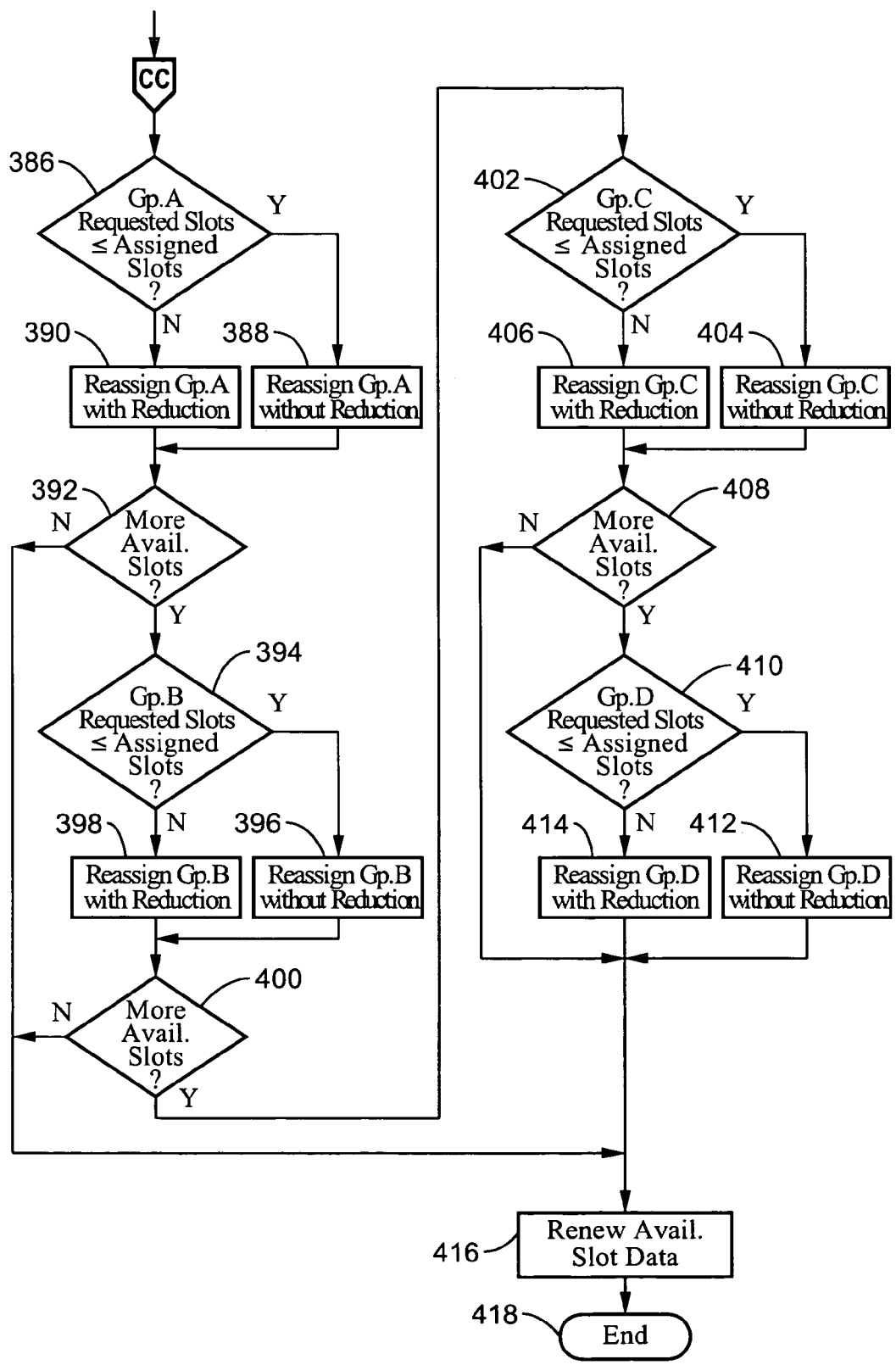
FIG. 7B is a continuation of the flowchart of FIG. 7A.

FIG. 7A and FIG. 7B illustrate an example of the algorithm for reassigning time slots when the associated streams are released. When time slots are released, the time slot allocation for that group needs to be updated to reflect the released time slots. The newly available time slots may then be utilized for other streams and they are made available to groups in the order of group priority, A, B, C, D.

Reassignment processing commences at block 350, and a check for time slot utilization before termination is performed at block 352. If all time slots were not utilized prior to termination of the stream, the execution proceeds to block 354 wherein the information on available time slots is renewed prior to exiting the procedure at block 356. It will be appreciated that if the time slots were not needed before a stream terminated, they will still not be needed in response to termination of the stream. The result is an increase in the number of available time slots for future assignment.

If however, all time slots were previously in use, as detected by block 352, then the freed-up time slots are preferably reallocated if any group has need. The time slots within the group terminating the stream must take into account the freed-up time slots, so minimization or reallocation within that group occurs first. At block 358 it is determined if the terminated stream was a group A stream. If it was a group A stream, then processing continues (through connector A-A) into FIG. 7B. It will be appreciated that group A streams are never minimized, being the highest priority, wherein time slots released by a group A stream may be immediately reassigned based on priority to a group.

If the released time slots were not associated to a group A stream, then it is determined at block 360 if they were released from a group B stream. Processing for a group B terminated stream continues at block 362, wherein the total time slots originally requested by all group B streams, except the terminated stream, are compared with the group B minimum slots. If the number of requested time slots still exceeds the minimum number of time slots, processing continues at block 364, wherein the number of time slots is kept at the minimum, and processing continues to determine a proper allocation for the newly freed-up time slots as represented by block 366. Even if the requested number of time slots for group B cannot be completely fulfilled, the resultant slot reduction ratio for group B will be less than it was before.

If, however, the number of time slots requested (a number that now reflects the time slots released) is not greater than the minimum number of time slots allotted for group B, then time slots are reassigned from those released as per block 368 and processing continues to determine a proper allocation for the newly freed-up time slots as represented by block 366. If available slots exists, they are allocated as processing continues, through connector CC to FIG. 7B.

If the terminated stream was either a group C or D stream, processing passes through blocks 358, 360 to block 372 wherein it is determined if the terminated stream was a group C stream. If the terminated stream was a group C stream, then processing continues at block 374, wherein the number of time slots utilized either remains at the minimum as per block 376, or some of the released slots are reassigned to fulfill the original time slot request as per block 378. In either case, if additional time slots are still available, as determined at block 366, then processing continues.

If the terminated stream was not a group C stream, as detected by block 372, then it must be a group D terminated stream, then processing continues at block 380, wherein the number of time slots is kept at a minimum as per block 384 if the requested number of time slots does not exceed the minimum number of time slots allocated for the group, otherwise the minimum time slots are assigned to group D, as shown by block 382, in an attempt to fulfill the original request. Again, any remaining additional time slots are detected and processed as per FIG. 7B.

Time slots which are still available are then assigned to groups, whose original time slot requests are not being met, as based on group priority. The reallocation of these time slots first checks time slot needs of group A streams and proceeds down through the groups based on priority until the released time slots are all reallocated or all slots have reached their desired level of time slot allocations, wherein additional time slots may be unused and thereby available for future group needs.

It is determined at block 386 if the group A streams were able to obtain the time slots they are requesting. If the requested number of time slots is equal to, or smaller than, the current number of time slots, execution branches to block 388, wherein the time slots reassignment algorithm is called and the slots are reassigned. No slot reduction is executed because there are enough slots for group A. If more time slots were requested than have been allocated, then the available time slots are utilized in an attempt to fulfill the original request as depicted in block 390, however, time slot reduction may still arise if sufficient time slots are not available. Although time slot-reduction may still be necessary after assigning additional time slots, it should be realized that the slot-reduction ratio improves as it moves closer to a one-to-one ratio between assigned time slots and requested time slots.

A check at block 392 is performed to determine if additional time slots exist. If the available time slots have been assigned, then no further checking is necessary; otherwise allocation of the available time slots continues. A check at block 394 determines if group B has requested more time slots than it is currently allocated. If group B has the number of time slots it requested then time slots may be reassigned as per block 396 without the need of a time slot reduction. If however, requested time slots exceed allocated time slots, then the available time slots may be reassigned, as per block 398, to meet the need. Lacking sufficient time slots to completely fulfill the requests of group B, a time slot reduction occurs to best utilize the available time slots.

A check for available time slots is performed at block 400, wherein remaining time slots may then be allocated to group C and/or to group D. A similar process of checking for time slot needs occurs at blocks 402, 410, and reassignment of time slots for fulfilled requests 404, 412, or reassignment with additional time slots with possible time slot reduction performed as per blocks 406, 414 for group C and group D.

After the above reallocation of available time slots the information about available time slots is updated as shown by block 416 and the process terminates 418.

4.4 Examples of Time Slot Management After Stream Termination.

Operation of the system, with regard to releasing time slots after a stream terminates, may be more clearly understood by way of example. Consider the same case as described previously in which the bandwidth comprises 250 time slots and the minimum number of slots allocated for each group given by: B: 80; C: 10; and D: 5, as listed in Table 1.

In the above scenario the bus is very busy and all the slots are fully utilized. Groups B, C and D have been reduced to the minimum assignable number of time slots, while time slot reduction occurs with group A slots reduced from 165 to 155. The slot number request and assignment conditions are listed in the before portion of Table 9.

4.4.1 Case 1.

Under the above conditions, consider that a group A stream has just terminated which originally requested 5 slots, wherein the transmitter responds to the event by asking the master to cancel 5 time slot requests bringing the total number of time slots requested by group A to 160 time slots for this example (165−5=160). It will be noted that the number of time slots requested still exceeds the 155 time slots currently assigned. Wherein after reassigning the time slots from the terminated stream, a slot reduction is executed. No additional time slots were available for use by group B, C and D streams. The execution path is described within the flowchart of FIG. 7A and FIG. 7B traversing blocks: 350, 352, 358, 386, 390, 392, 416, and 418. Time slot assignments before and after executing the new above reassignments are shown in Table 9.

In the above scenario it should be noted that the number of requested time slots dropped by 5, however, the utilization remained the same because the time slots released by a group A stream were utilized by other group A streams. The reduction ratio for group A changed from 155/165 to 155/160 allowing streams within group A to achieve higher data rates in response to termination of one stream that utilized 5 time slots.

4.4.2 Case 2.

In this scenario consider a group A stream being terminated which had requested 40 time slot requests. In response to this event the transmitter requests the master to cancel the 40 time slots, wherein the total number of time slots requested for group A drops down to 125 time slots, (165−40=125). Because the total number of time slots requested is less than the current number 155 of time slots assigned, 30 time slots become available to other lower priority streams, (155−125=30 time slots). Of these time slots 20 are assigned to group B which is requesting 100 time slots, while the remaining 10 time slots are utilized for group C bringing the total number of time slots assigned to group C up to 20. No additional time slots are made available for group D streams. The execution path is described within the flowchart of FIG. 7A and FIG. 7B traversing blocks: 350, 352, 358, 386, 388, 392, 394, 396, 400, 402, 404, 408, 416, and 418. Time slot assignments before and after executing the above reassignments are shown in Table 10.

It will be appreciated from viewing Table 10 that all available time slots are still being utilized, however, now group A, group B, and group C streams are being transmitted at the requested rate, while time slot reduction remains for group D streams.

4.4.3 Case 3.

Consider this case in which the transmitter terminates a group B stream that had originally requested 42 time slots. In response to this event the transmitter asks the master to cancel 42 of the time slot requests, wherein the requested number of time slots for group B drops from 100 down to 58, (100−42=58). Currently group B is assigned 80 time slots, and the system frees a total of 22 time slots, (80−58=22). The first 10 time slots are assigned to the highest priority streams in group A to meet the request for 165 time slots. A total of 10 more time slots are assigned for streams within group C bringing it to 20 assigned time slots, while the remaining 2 time slots are assigned to group D, which still is subject to slot reduction, having requested 10 time slots and now receiving 7 of those 10 time slots, instead of the previous 5 of the 10 time slots requested. The execution path is described within the flowchart of FIG. 7A and FIG. 7B traversing blocks: 350, 352, 358, 360, 362, 368, 366, 386, 388, 392, 394, 396, 400, 402,

404, 408, 410, 414, 416, and 418. Time slot assignments before and after executing the above reassignments are shown in Table 11.

It will be appreciated from viewing Table 11 that all available time slots are still being utilized, however, now group A, group B, and group C streams are being transmitted at the requested rate, while less time slot reduction is being executed for streams in group D.

4.4.4 Case 4.

Consider this scenario wherein the transmitter terminates a group B stream that had requested 10 time slots. In response to this event the transmitter requests the master to cancel 10 of the requested time slots, wherein the number of time slots requested by group B drops from 100 time slots down to 90 time slots, (100−10=90 time slots). The 90 time slots requested still exceed the 80 time slot minimum allocated for group B, wherein the 10 extra time slots are utilized for group A streams, thus fulfilling their full request for 165 time slots. The minimum of 80 time slots are again assigned for group B, and no additional time slots are available for speeding up group B streams or the streams at a lower priority. The execution path is described within the flowchart of FIG. 7A and FIG. 7B traversing blocks: 350, 352, 358, 360, 362, 364, 366, 386, 388, 392, 416 and 418. Time slot assignments before and after executing the above reassignments are listed in Table 12.

It will be appreciated that all available time slots are still being utilized, however, now group A streams are being transmitted at the requested rate. The group B reduction ratio changed from 80/100 to 80/90, allowing video streams in group B to achieve higher rates even though additional time slots were not assigned.

4.5 Optional and Alternative Aspects.

The flowcharts described above illustrate in a convenient form the general flow of a preferred embodiment of the present invention. However, the handling of stream priority within the present invention may be implemented in a number of alternative ways using alternative program flows without departing from the present invention. Aspects of the invention have been generally described in relation to this preferred embodiment, however, the invention may be implemented with a number of variations and alternatives without departing from the teachings of the present invention.

By way of example, an arbitrary number of priority groups may be supported by the present invention, these need not be limited to practicing the described four priority groups. It will be appreciated that the degenerative case of a single priority group is operational for sharing bandwidth across the virtual networks without regard to stream priority.

The transmission requirements for a stream are generally described herein relating to an original request for a number of time slots however, it will be appreciated that the number of time slots requested for a stream may dynamically change in response to conditions (i.e. noise), external conditions of the application, or historical time slot allocations. For instance, a stream may only require X time slots to maintain a desired communication, however, after being held to an allocation of X−Y time slots for a period T, it may have dropped below a desired "synchronization level" or other metric of the application and thereby request an allocation of X+Z time slots to recoup losses as warranted by the application.

5. Adaptive Bandwidth Control.

As the conditions on the power line change dynamically from moment to moment, the present system is preferably configured to adaptively control the amount of bandwidth assigned to the streams. For example, when noise conditions get worse, a stream might require more time slots than currently assigned, wherein the transmitter requests additional time slots from the master. The master preferably handles the requests as a new stream request and applies the same slot management algorithm and slot reassignment algorithm described above. If time slots are available, then the transmitter utilizes the original slots along with the newly assigned time slots for carrying the same stream.

When noise conditions improve, the transmitter may request that the master cancel its additionally requested time slots. The master preferably handles the request as a stream termination of the newly assigned stream and applies the same slot management algorithm and slot reassignment algorithm.

6. Variations.

The prioritization of time slot use by streams is described herein according to fixed group priorities, however, the present invention may be configured with mechanisms for adjusting group priorities and even individual stream-based priorities in response to need or history. For example, the priority of a stream toward gaining additional time slots may increase in response to the difference between requested time slots and allocated time slots over a period of time or history. In this way stream bandwidth deprivation may be controlled in response to the needs of any specific application. By way of further example, streams could be promoted between groups based on external condition changes, historical time slot assignment, or other determiners, without departing from the teachings of the present invention.

The present system preferably employs a form of time division multiple access (TDMA), in which a bandwidth unit is represented as a number of time slots. It should be appreciated, however, that the present invention is not limited to utilizing TDMA, as a number of bandwidth allocation mechanisms may be alternatively utilized without departing from the present invention. By way of example and not limitation, a form of frequency division multi access (FDMA) may be alternately employed in which frequency slots are assigned to a stream instead of time slots. A hybrid bandwidth allocation may also be created utilizing a combination of TDMA and FDMA within an embodiment of the present invention.

It should also be appreciated that the UWB communication capability of the described system may be replaced with other mechanisms for communicating with devices at a destination end, such as wired links, other wireless communication links, infrared links and the like. Incorporation of the described bandwidth allocation mechanisms for power-line communication networks, and similar shared network arrangements, allows the bandwidth of the power-line to be equitable shared while supporting any of these remote communication methods.

The PLC/UWB module described for the present system can be replaced by other conversion devices for use within the present system. By way of first example the charger for an electronic device, such as a PDA, telephone, camera, or similar, may be configured to communicate over the PLC network with a server or other device. Preferably, the circuitry of the charger is configured to request bandwidth allocations from the bus master and to communicate over the allocated portions of the PLC bandwidth, in a manner as described for the PLC/UWB module. This implementation allows any device that requires periodic charging and is capable of uploading and/or downloading data to communicate that data with a remote computer over the PLC network. This uploading and downloading can occur automatically in response to connecting of the device to the charger, wherein synchronization and other benefits may be readily derived.

By way of a second example, a PLC to power-plane network conversion can be implemented, wherein the power-line signals are converted within circuitry integrated with the combination power supply and communications interface of what is being referred to generally as a power-plane network. These power planes may be implemented as desk blotters upon which devices such as PDAs, phones, and other small portable devices may be placed at any arbitrary location to achieve a charging connection and a communication connection for synchronizing the device to applications within a computer or other device. Charging and communication are achieved on these power-planes utilizing inductive coupling and/or an array of conductive connections. Incorporating conversion from a PLC network to a power plane network allows remote power planes to be utilized away from a computer system without the need for routing a dedicated connection.

It will be appreciated that present invention has been described in association with implementation using a power-line network. However, it should be appreciated that the invention can be applied to other technologies including those which are wired, wireless, and which may utilize other network technologies. As can be seen, therefore, PLC technology takes advantage of a readily available extensive infrastructure for high-bandwidth communication. The PLC/UWB modules provide high bandwidth localized wireless access to the PLC system. This combination accommodates multiple users without causing interference among users. Unlike 802.11a wireless systems, for example, UWB is not intended to penetrate walls.

It will also be appreciated that the present invention has been described according to a preferred embodiment having one or more optional features. It should be appreciated that the invention may be implemented with or without these features or variations thereof without departing from the teachings of the present invention. Aspects of the invention may be practiced in combination, or in some cases separate from the overall bandwidth management system, without departing from the teachings of the invention.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

Minimum Time Slot Allocations for Examples (Tables 2-8)

| Group | Minimum Number of Slots |
|---|---|
| A | N/A- |
| B | 80 |
| C | 10 |
| D | 5 |
| Total | 95 |

TABLE 2

Event: New group D stream(s) gaining slots from Group A

| | Number of Slots | | | |
|---|---|---|---|---|
| | Before | | After | |
| Group | requested | assigned | requested | assigned |
| A | 250 | 250 | 250 | 245 |
| B | 0 | 0 | 0 | 0 |
| C | 0 | 0 | 0 | 0 |
| D | 0 | 0 | 5 | 5 |
| Total | 250 | 250 | 255 | 250 |

TABLE 3

Event: New group B stream obtaining slots

| | Number of Slots | | | |
|---|---|---|---|---|
| | Before | | After | |
| Group | requested | assigned | requested | assigned |
| A | 230 | 230 | 230 | 195 |
| B | 0 | 0 | 40 | 40 |
| C | 15 | 15 | 15 | 10 |
| D | 5 | 5 | 5 | 5 |
| Total | 250 | 250 | 290 | 250 |

TABLE 4

Event: New group B stream attempts to obtain more than minimum slots

| | Number of Slots | | | |
|---|---|---|---|---|
| | Before | | After | |
| Group | requested | assigned | requested | assigned |
| A | 230 | 230 | 230 | 155 |
| B | 0 | 0 | 100 | 80 |
| C | 15 | 15 | 15 | 10 |
| D | 5 | 5 | 5 | 5 |
| Total | 250 | 250 | 290 | 250 |

TABLE 5

Event: New group D stream requests 10 time slots

| Group | Before requested | Before assigned | After requested | After assigned |
|---|---|---|---|---|
| A | 120 | 120 | 120 | 120 |
| B | 100 | 100 | 100 | 100 |
| C | 15 | 15 | 15 | 15 |
| D | 10 | 10 | 20 | 15 |
| Total | 245 | 245 | 255 | 250 |

TABLE 6

Event: New group C stream requests 20 more time slots

| Group | Before requested | Before assigned | After requested | After assigned |
|---|---|---|---|---|
| A | 120 | 120 | 120 | 120 |
| B | 100 | 100 | 100 | 100 |
| C | 15 | 15 | 35 | 25 |
| D | 10 | 10 | 10 | 5 |
| Total | 245 | 245 | 260 | 250 |

TABLE 7

Event: New group B stream requests 20 more time slots

| Group | Before requested | Before assigned | After requested | After assigned |
|---|---|---|---|---|
| A | 120 | 120 | 120 | 120 |
| B | 100 | 100 | 120 | 115 |
| C | 15 | 15 | 15 | 10 |
| D | 10 | 10 | 10 | 5 |
| Total | 245 | 245 | 265 | 250 |

TABLE 8

Event: New group A stream requests 33 more time slots

| Group | Before requested | Before assigned | After requested | After assigned |
|---|---|---|---|---|
| A | 120 | 120 | 153 | 153 |
| B | 100 | 100 | 100 | 82 |
| C | 15 | 15 | 15 | 10 |
| D | 10 | 10 | 10 | 5 |
| Total | 245 | 245 | 278 | 250 |

TABLE 9

Event: group A terminates 5 time slots

| Group | Before requested | Before assigned | After requested | After assigned |
|---|---|---|---|---|
| A | 165 | 155 | 160 | 155 |
| B | 100 | 80 | 100 | 80 |
| C | 20 | 10 | 20 | 10 |
| D | 10 | 5 | 10 | 5 |
| Total | 295 | 250 | 290 | 250 |

TABLE 10

Event: group A terminates 40 time slots

| Group | Before requested | Before assigned | After requested | After assigned |
|---|---|---|---|---|
| A | 165 | 155 | 125 | 125 |
| B | 100 | 80 | 100 | 100 |
| C | 20 | 10 | 20 | 20 |
| D | 10 | 5 | 10 | 5 |
| Total | 295 | 250 | 255 | 250 |

TABLE 11

Event: group B terminates 42 time slots

| Group | Before requested | Before assigned | After requested | After assigned |
|---|---|---|---|---|
| A | 165 | 155 | 165 | 165 |
| B | 100 | 80 | 58 | 58 |
| C | 20 | 10 | 20 | 20 |
| D | 10 | 5 | 10 | 7 |
| Total | 295 | 250 | 253 | 250 |

TABLE 12

Event: group B terminates 10 time slots

| Group | Before requested | Before assigned | After requested | After assigned |
|---|---|---|---|---|
| A | 165 | 155 | 165 | 165 |
| B | 100 | 80 | 90 | 80 |
| C | 20 | 10 | 20 | 10 |
| D | 10 | 5 | 10 | 5 |
| Total | 295 | 250 | 285 | 250 |

What is claimed is:

1. An apparatus for forwarding audio/video data content to a remote wireless device, comprising:
   a content server device configured for receiving data content from an external source of audio data content, video data content or both audio and video data content;
   wherein said content server device is configured for transmitting said data content, as one or more data streams, over a physical power line communications (PLC) network;
   wherein said content server device is configured for operating on a PLC network which can be bounded by a distribution transformer upon which multiple servers of multiple users are operating in different virtual networks;
   wherein said content server device, and other servers on the same PLC network but within different virtual networks, are configured to determine which server is to be bus master of the PLC network for controlling allocation of PLC bandwidth within each virtual network on the PLC network; and
   at least one PLC to wireless conversion module configured for receiving streaming data over the PLC network and outputting said data streams over a short-range wireless transmitter to at least one remote user device;
   wherein said content server is configured to encrypt and decrypt data being communicated over the respective virtual networks to each PLC to wireless conversion module, thereby preventing content from being accessed by other virtual networks connected within the same PLC network.

2. An apparatus as recited in claim 1, wherein said external source of audio and video data content is selected from the group consisting of a media player, DVD, CD, PVR, DVR, STB, live feed, cable feed, satellite feed, broadcast feed, Internet connection, and high or low bandwidth telephone connection.

3. An apparatus as recited in claim 1, wherein said content server is configured to collect data content, to distribute data content, or to both collect and distribute data content.

4. An apparatus as recited in claim 1, wherein said content server device includes a communications interface configured for interfacing said content server device with a network.

5. An apparatus as recited in claim 1, wherein said content server device includes a computer processor and programming executable on said computer processor for carrying out the operations of,
   dividing available bandwidth of the network into assignable units,
   categorizing content streams that are to be communicated over the network into priority groups,
   assigning units of bandwidth to said priority groups in response to the bandwidth requirements of said content streams and the transmission priority of said priority group, and
   assigning specific units of bandwidth to specific content streams within each of said priority groups in response to an equitable sharing of bandwidth on said network.

6. An apparatus as recited in claim 1:
   wherein said content server device includes a computer processor and programming executable on said computer processor for carrying out the operations of:
     dividing available bandwidth of the network into assignable units,
     categorizing content streams that are to be communicated over the network into priority groups,
     assigning units of bandwidth to said priority groups in response to the bandwidth requirements of said content streams and the transmission priority of said priority group, and
     assigning specific units of bandwidth to specific content streams within each of said priority groups in response to an equitable sharing of bandwidth on said network;
   wherein bandwidth within a given priority group is assigned by said content server device to a plurality of said remote devices on an as-needed basis and said remote devices are permitted to utilize up to their equal share of bandwidth within said given priority group; and
   wherein additional available bandwidth is equally divided between virtual networks with unfulfilled bandwidth requests.

7. A system for forwarding audio/video data content through a power-line communications (PLC) network to a remote wireless device, comprising:
   a content server device configured for receiving data content from an external source of audio data content, video data content or both audio and video data content;
   wherein said content server device is configured for transmitting said data content, as one or more data streams, over a physical power line communications (PLC) network;
   wherein said content server device is configured for operating on a PLC network which can be bounded by a distribution transformer upon which multiple servers of multiple users are operating in different virtual networks;
   wherein said content server device, and other servers on the same PLC network but within different virtual networks, are configured to determine which server is to be selected as bus master of the PLC network for controlling allocation of PLC bandwidth within each virtual network on the PLC network to assign one or more time slots to each said data stream being directed to a remote wireless device; and
   at least one PLC to wireless conversion module configured for receiving streaming data over the PLC network, utilizing bandwidth according to the direction of the selected bus master, and outputting said streaming data over a short-range wireless transmitter to at least one remote user device
   wherein said content server device is configured to encrypt and decrypt data being communicated over the respective virtual networks to each PLC to wireless conversion module, thereby preventing content from being accessed by other virtual networks connected within the same PLC network.

8. A system as recited in claim 7, wherein said external source of audio and video data content is selected from the group consisting of a media player, DVD, CD, PVR, DVR, STB, live feed, cable feed, satellite feed, broadcast feed, Internet connection, and high or low bandwidth telephone connection.

9. A system as recited in claim 7, wherein said content server is configured to collect data content, to distribute data content, or to both collect and distribute data content.

10. A system as recited in claim 7, wherein said content server device includes a communications interface configured for interfacing said content server device with a network.

11. A system as recited in claim 7, further comprising:
   a plurality of remote user devices;
   each said remote user device configured for receiving data content from a content server.

12. A system as recited in claim 7, further comprising:
a plurality of remote user devices;
each said remote user device configured for receiving data content from a content server; and
a remote communications module configured for transmitting said data content received from said content server to a remote user device.

13. A system as recited in claim 7, further comprising:
a plurality of remote user devices;
each said remote user device configured for receiving data content from a content server; and
a remote communications module configured for transmitting said data content received from said content server to a remote user device;
wherein a said communications module includes a network interface configured for interfacing said communications module with a wired network.

14. A system as recited in claim 7, further comprising:
a plurality of remote user devices;
each said remote user device configured for receiving data content from a content server; and
a remote communications module configured for transmitting said data content received from said content server to a remote user device;
wherein a said communications module includes a wireless transmitter configured to transmit said data content received from said content server device to a wireless receiver associated with the remote user device.

15. A system as recited in claim 7, further comprising:
a plurality of remote user devices;
each said remote user device configured for receiving data content from a content server; and
a remote communications module configured for transmitting said data content received from said content server to a remote user device;
wherein a said communications module includes a power line communications (PLC) receiver configured to receive said data content from said content server device.

16. A system as recited in claim 7, wherein said content server device includes a computer processor and programming executable on said computer processor for carrying out the operations of,
dividing available bandwidth of the network into assignable units, categorizing content streams that are to be communicated over the network into priority groups,
assigning units of bandwidth to said priority groups in response to the bandwidth requirements of said content streams and the transmission priority of said priority group, and
assigning specific units of bandwidth to specific content streams within each of said priority groups in response to an equitable sharing of bandwidth on said network.

17. A system as recited in claim 7:
wherein said content server device includes a computer processor and programming executable on said computer processor for carrying out the operations of,
dividing available bandwidth of the network into assignable units, categorizing content streams that are to be communicated over the network into priority groups,
assigning units of bandwidth to said priority groups in response to the bandwidth requirements of said content streams and the transmission priority of said priority group, and
assigning specific units of bandwidth to specific content streams within each of said priority groups in response to an equitable sharing of bandwidth on said network;
wherein bandwidth within a given priority group is assigned by said content server device to a plurality of said remote devices on an as-needed basis and said remote devices are permitted to utilize up to their equal share of bandwidth within said given priority group; and
wherein additional available bandwidth is equally divided between virtual networks with unfulfilled bandwidth requests.

18. An apparatus for forwarding audio/video data content through a power-line communications (PLC) network to a remote wireless device, comprising:
a content server device configured for receiving data content from an external source of audio data content, video data content or both audio and video data content;
wherein said content server device is configured for transmitting said data content, in the form of one or more data streams, over a physical power line communications (PLC) network;
wherein said content server device is configured for operating on a PLC network which can be bounded by a distribution transformer upon which multiple servers of multiple users are operating in different virtual networks;
wherein said content server device, and other servers connected to the same PLC network but within different virtual networks, are configured to select which server is to operate as bus master of the PLC network for controlling allocation of PLC bandwidth within each virtual network on the PLC network; and
at least one PLC to ultra-wide band (UWB) conversion module configured for receiving streaming data over the PLC network and outputting said data streams over ultra-wide band transmissions to at least one remote user device;
said UWB transmissions configured to minimize interference with existing devices in response to spreading signal power over a wide band of frequencies during transmission;
wherein said content server device is configured to encrypt and decrypt data being communicated over the respective virtual networks to each PLC to wireless conversion module, thereby preventing content from being accessed by other virtual networks connected within the same PLC network.

19. An apparatus as recited in claim 18, wherein said external source of audio and video data content is selected from the group consisting of a media player, DVD, CD, PVR, DVR, STB, live feed, cable feed, satellite feed, broadcast feed, Internet connection, and high or low bandwidth telephone connection.

20. An apparatus as recited in claim 18, wherein said content server is configured to collect data content, to distribute data content, or to both collect and distribute data content.

* * * * *